US010638280B2

(12) United States Patent
Shan et al.

(10) Patent No.: US 10,638,280 B2
(45) Date of Patent: Apr. 28, 2020

(54) METHOD AND SYSTEM FOR FACILITATING REAL-TIME LOCATION SHARING

(71) Applicant: Tencent Technology (Shenzhen) Company Limited, Shenzhen (CN)

(72) Inventors: Yi Shan, Shenzhen (CN); Jun Wang, Shenzhen (CN); Pinlin Chen, Shenzhen (CN); Dacheng Zhuo, Shenzhen (CN); Ling Li, Shenzhen (CN); Liang Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/179,758

(22) Filed: Nov. 2, 2018

(65) Prior Publication Data
US 2019/0075433 A1    Mar. 7, 2019

Related U.S. Application Data

(63) Continuation of application No. 15/187,587, filed on Jun. 20, 2016, now Pat. No. 10,154,389, which is a
(Continued)

(30) Foreign Application Priority Data

Mar. 17, 2014    (CN) .......................... 2014 1 0100449

(51) Int. Cl.
*H04W 24/00*    (2009.01)
*H04W 4/21*    (2018.01)
(Continued)

(52) U.S. Cl.
CPC ............. *H04W 4/21* (2018.02); *H04L 51/046* (2013.01); *H04L 51/20* (2013.01); *H04L 51/32* (2013.01);
(Continued)

(58) Field of Classification Search
CPC ....... H04W 4/21; H04W 4/029; H04W 4/023; H04W 4/08; H04W 4/028; H04L 51/046; H04L 51/20; H04L 51/32; H04M 1/72552
See application file for complete search history.

(56) References Cited

U.S. PATENT DOCUMENTS 10,382,378 B2 *    8/2019    Garcia .................... H04L 51/20
2008/0070593 A1 *    3/2008    Altman ................. H04W 4/029
455/457

(Continued)

FOREIGN PATENT DOCUMENTS

CN    101742639 A    6/2010
CN    102067654 A    5/2011
(Continued)

OTHER PUBLICATIONS

Tencent Technology, ISRWO, PCT/CN2015/070322, dated Mar. 27, 2015, 8 pgs.
(Continued)

*Primary Examiner* — Barry W Taylor
(74) *Attorney, Agent, or Firm* — Morgan, Lewis & Bockius LLP

(57) ABSTRACT

Methods and systems for sharing real-time location information are disclosed herein. A computing device with processor(s) and memory displays a chat interface of a social networking platform for a conversation between a first user and a second user associated with the computing device. The computing device receives a location-sharing request from the first user to join a real-time location sharing group and,
(Continued)

in response, displays a location-sharing message. After detecting a first user input on the location-sharing message from the second user of the computing device, the computing device replaces the chat interface with a location interface of the social networking platform, the location interface including a map overlaid with a first indicator corresponding to a respective real-time location of the first user and a second indicator corresponding to a respective real-time location of the second user.

18 Claims, 24 Drawing Sheets

Related U.S. Application Data continuation of application No. PCT/CN2015/070322, filed on Jan. 8, 2015.

(51) Int. Cl.
  *H04W 4/029* (2018.01)
  *H04W 4/08* (2009.01)
  *H04L 12/58* (2006.01)
  *H04M 1/725* (2006.01)
  *H04W 4/02* (2018.01)

(52) U.S. Cl.
  CPC ....... *H04M 1/72552* (2013.01); *H04W 4/023* (2013.01); *H04W 4/029* (2018.02); *H04W 4/08* (2013.01)

(56) References Cited

U.S. PATENT DOCUMENTS

| | | | |
|---|---|---|---|
| 2010/0110105 A1* | 5/2010 | Kinnunen | G01C 21/20 345/629 |
| 2012/0172062 A1 | 7/2012 | Altman et al. | |
| 2012/0265823 A1* | 10/2012 | Parmar | H04W 4/21 709/206 |
| 2012/0302258 A1 | 11/2012 | Pai et al. | |
| 2013/0226453 A1 | 8/2013 | Trussel et al. | |
| 2014/0066105 A1 | 3/2014 | Bridge et al. | |
| 2014/0181698 A1* | 6/2014 | Choi | H04L 51/20 715/758 |
| 2014/0329548 A1* | 11/2014 | Tharshanan | H04W 4/12 455/457 |
| 2015/0119080 A1* | 4/2015 | Husain | H04W 4/023 455/456.2 |
| 2017/0048686 A1* | 2/2017 | Chang | H04W 4/14 |

FOREIGN PATENT DOCUMENTS

| | | |
|---|---|---|
| CN | 102440011 A | 5/2012 |
| CN | 103517207 A | 1/2014 |
| CN | 104123333 A | 10/2014 |

OTHER PUBLICATIONS

Tencent Technology,IPRP, PCT/CN2015/070322, dated Sep. 20, 2016, 6 pgs.

* cited by examiner

```
       ┌─ C ─┐
         ▼
```

In response to detecting the first user input, display an interface switching affordance for displaying the chat interface in the location interface;  — 916

Detect a second user input from the second user of the computing device selecting the interface switching affordance; and In response to detecting the second user input, display the chat interface, where the location sharing banner is displayed in the second region of the chat interface with a second display characteristic indicating that the second user of the computing device has joined the real-time location sharing group In response to detecting the first user input, display at least a first avatar corresponding to the first user and a second avatar corresponding to the second user in a region of the location interface distinct from the  — 918

Detect a second user input from the second user of the computing device selecting the first avatar; and  — 920

In response to detecting the second user input, center the map displayed in the first region of the location interface relative to the first indicator corresponding to the real-time location of the first user

```
       ┌─ D ─┐
         ▼
```

In response to detecting a scrolling gesture, display a second set of one or more messages in the first region of the chat interface, where the second set of one or more messages includes at least one message not included in the first set of one or more messages and corresponding to a previous location sharing request from a respective one of the two or more users;  — 922

Detect a first user input from the second user of the computing device selecting the at least one message in the second set of one or more messages displayed in the first region of the chat interface; and In response to detecting the first user input, display a location interface of the social networking platform, where the location interface includes a map overlaid with a first indicator corresponding to a respective real-time location of the respective one of the two or more users and a second indicator corresponding to a respective real-time location of the second user

METHOD AND SYSTEM FOR FACILITATING REAL-TIME LOCATION SHARING

PRIORITY CLAIM AND RELATED APPLICATION

This application is a continuation application of U.S. patent application Ser. No. 15/187,587, entitled "METHOD AND SYSTEM FOR FACILITATING REAL-TIME LOCATION SHARING" filed on Jun. 20, 2016, which is a continuation application of PCT Patent Application No. PCT/CN2015/070322, entitled "METHOD AND SYSTEM FOR FACILITATING REAL-TIME LOCATION SHARING" filed on Jan. 8, 2015, which claims priority to Chinese Patent Application No. 201410100449.5, entitled "Data Processing Method and Apparatus Used for Location Sharing," filed on Mar. 17, 2014, all of which are incorporated by reference in their entirety.

TECHNICAL FIELD

The present disclosure relates to the field of Internet technologies, and in particular, to a method and system for facilitating real-time location sharing.

BACKGROUND

With the development of Internet technologies, location sharing is frequently used. A sharer informs others of a geographical location where the sharer is located, and a person with whom the geographical location is shared can learn the geographical location of the sharer. In the prior art, during the location sharing process, a screenshot of a geographical location of a sharer on a map is presented to a person with whom the geographical location is shared, or only a name of the geographical location where the sharer is located is displayed. The person with whom the geographical location is shared clicks the screenshot or the name to enter the map to view the location of the sharer in the map.

SUMMARY

At least the following problem(s) exist in the prior art: With existing location sharing, a person with whom geographical location is shared is enabled according to the shared information to view geographical location information of the sharer, but the sharer cannot invite other users to perform geographical location sharing, resulting in a single form by which a user can perform geographical location sharing. The single form by which a user performs geographical location sharing in the prior art needs improvement.

In some embodiments, a method of facilitating real-time location sharing is performed at a computing device (e.g., client device 104, FIGS. 1 and 3) with one or more processors and memory. The method includes displaying a chat interface of a social networking platform for a conversation between two or more users including at least a first user and a second user, where the second user is associated with the computing device and the first user is associated with a device other than the computing device. The method includes receiving a location-sharing request from the first user to the second user in the social networking platform to join a real-time location sharing group. In response to receiving the location-sharing request, the method includes: displaying a respective message from the first user among a first set of one or more messages in a first region of the chat interface, where the respective message corresponds to the location sharing request to join the real-time location sharing group; and displaying a location sharing status banner corresponding to at least the location-sharing request from the first user in a second region of the chat interface, where the location sharing status banner is displayed with a first display characteristic indicating that the second user of the computing device has not yet joined the real-time location sharing group.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 9A-9D illustrate a flowchart diagram of a method of facilitating real-time location sharing in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
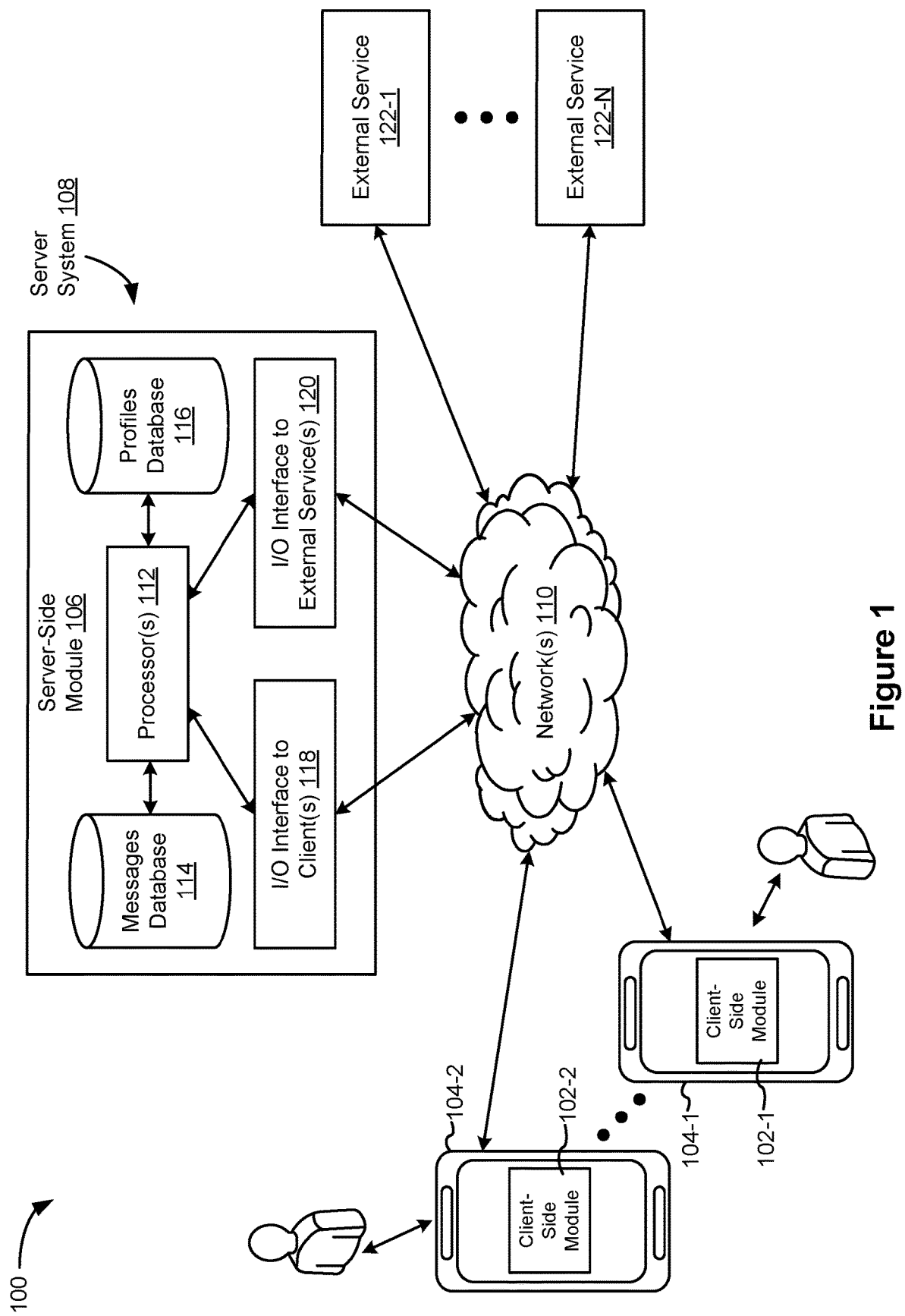
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112, messages database 114, profiles database 116, an I/O interface to one or more clients 118, and an I/O interface to one or more external services 120. I/O interface to one or more clients 118 facilitates the client-facing input and output processing for server-side module 106. In some embodiments, processor(s) 112 process requests for Internet access via an access point based on a relationship in the social networking platform between a first account corresponding to the provider of the access point and a second account corresponding to the requestor. Messages database 114 stores messages sent by users in the social networking platform, and profiles database 116 stores user profiles for users of the social networking platform. I/O interface to one or more external services 120 facilitates communications with one or more external services 122 (e.g., online or in-person retailers, banking services, online shopping services, account settlement services, application hosting, web hosting, or cloud-based services such as video and/or image hosting and storage websites).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an eBook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of server system 108, the corresponding actions performed by client device 104 would be apparent to ones skilled in the art without any creative efforts. Furthermore, some aspects of the present technology may be performed by server system 108, client device 104, or server system 108 and client device 104 cooperatively.

Figure 2:
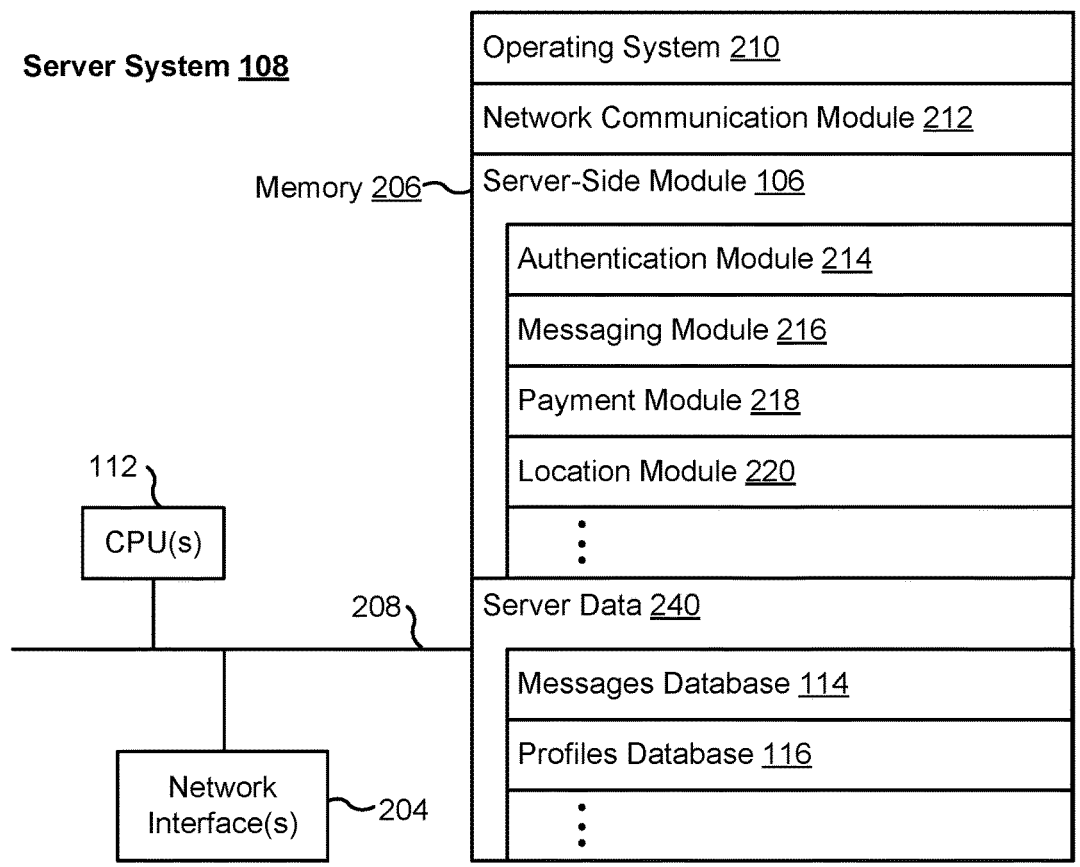
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:
- operating system 210 including procedures for handling various basic system services and for performing hardware dependent tasks;
- network communication module 212 for connecting server system 108 to other computing devices (e.g., client devices 104 and one or more external services 122) connected to one or more networks 110 via one or more network interfaces 204 (wired or wireless);
- server-side module 106, which provides server-side data processing and functionalities for the social networking platform, including but not limited to:
  - authentication module 214 for performing an authentication process to validate a user account to access the social networking platform;
  - messaging module 216 for managing and routing messages sent between users of the social networking platform;
  - (optional) payment module 218 for processing transactions for a respective user of the social networking platform based on payment data in a user profile in profiles database 116 corresponding to the respective use; and location module 220 for providing a location interface to a user of the social networking platform with the locations of one or more users of a location sharing group;
- server data 240 storing data for the social networking platform, including but not limited to:
  - messages database 114 storing messages sent by users in the social networking platform; and
  - profiles database 116 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
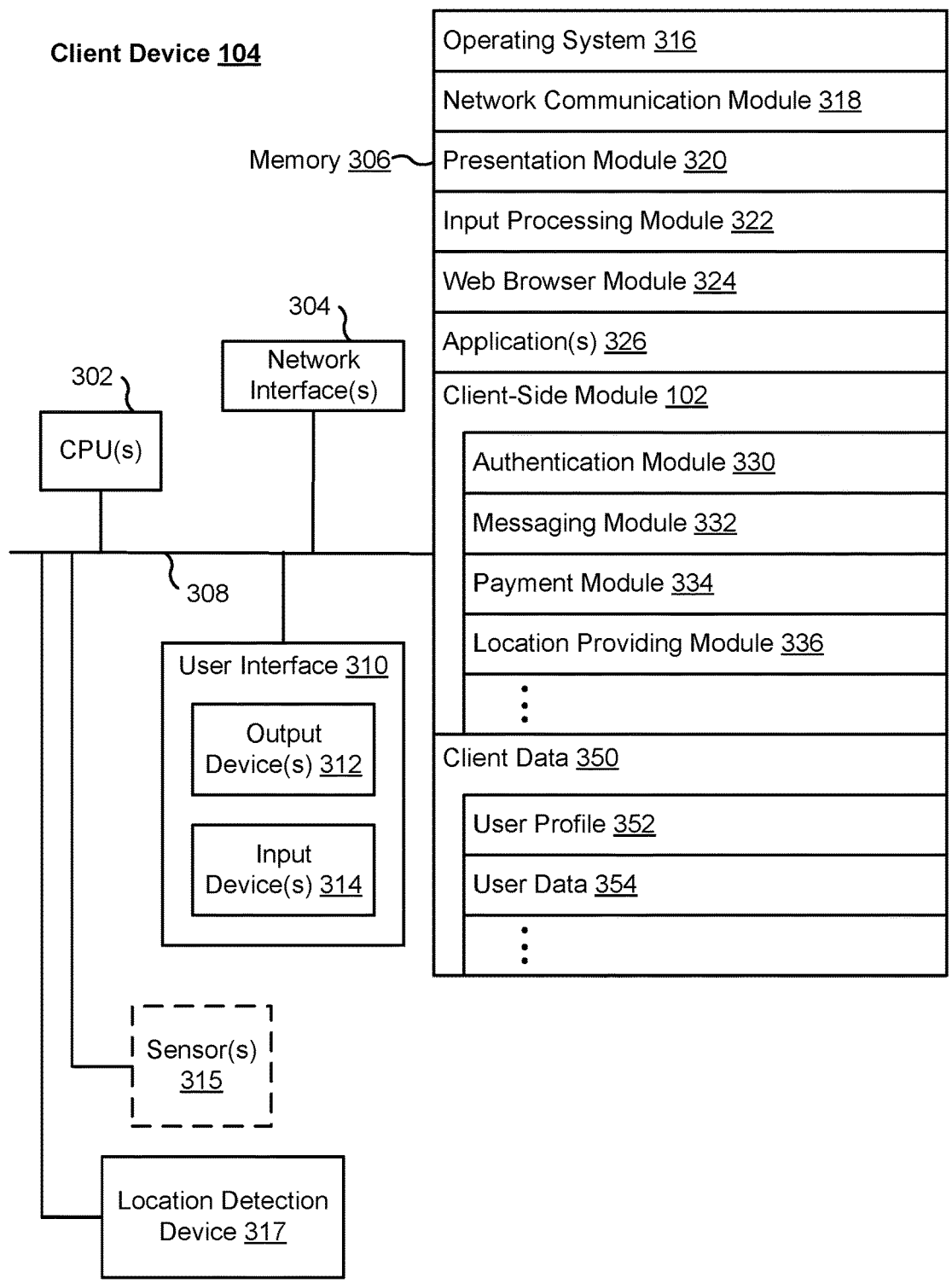
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 optionally includes one or more sensors 315, which provide context information as to the current state of client device 104 or the environmental conditions associated with client device 104. Sensor(s) 315 include but are not limited to one or more microphones, one or more cameras, an ambient light sensor, one or more accelerometers, one or more gyroscopes, a temperature sensor, one or more motion sensors, one or more biological sensors (e.g., a galvanic skin resistance sensor, a pulse oximeter, and the like), and other sensors. In some embodiments, client device 104 includes a location detection device 317, such as a GPS (global positioning satellite) or other geo-location receiver, for determining the location of client device 104.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:
- operating system 316 including procedures for handling various basic system services and for performing hardware dependent tasks;
- network communication module 318 for connecting client device 104 to other computing devices (e.g., server system 108 and one or more external services 122) connected to one or more networks 110 via one or more network interfaces 304 (wired or wireless);
- presentation module 320 for enabling presentation of information (e.g., a user interface for application(s) 326 or the social networking platform, widgets, websites and web pages thereof, and/or games, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326 for execution by client device 104 (e.g., games, application marketplaces, payment platforms, and/or other web or non-web based applications);

client-side module 102, which provides client-side data processing and functionalities for the social networking platform, including but not limited to:

authentication module 330 for authenticating the user of client device 104 to access his/her respective user account in the social networking platform;

messaging module 332 for sending messages to and receiving messages from other users of the social networking platform (e.g., instant messaging, group chat, message board, message/news feed, and the like);

(optional) payment module 334 for processing payments associated with transactions initiated within the social networking platform or at a merchant's website within web browser module 324; and location providing module 336 for determining the location of client device 104 and providing the determined location to server system 108;

client data 350 storing data associated with the social networking platform, including, but is not limited to:

user profile 352 storing a user profile for the user of client device 104, including, but not limited to, a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user; and user data 354 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
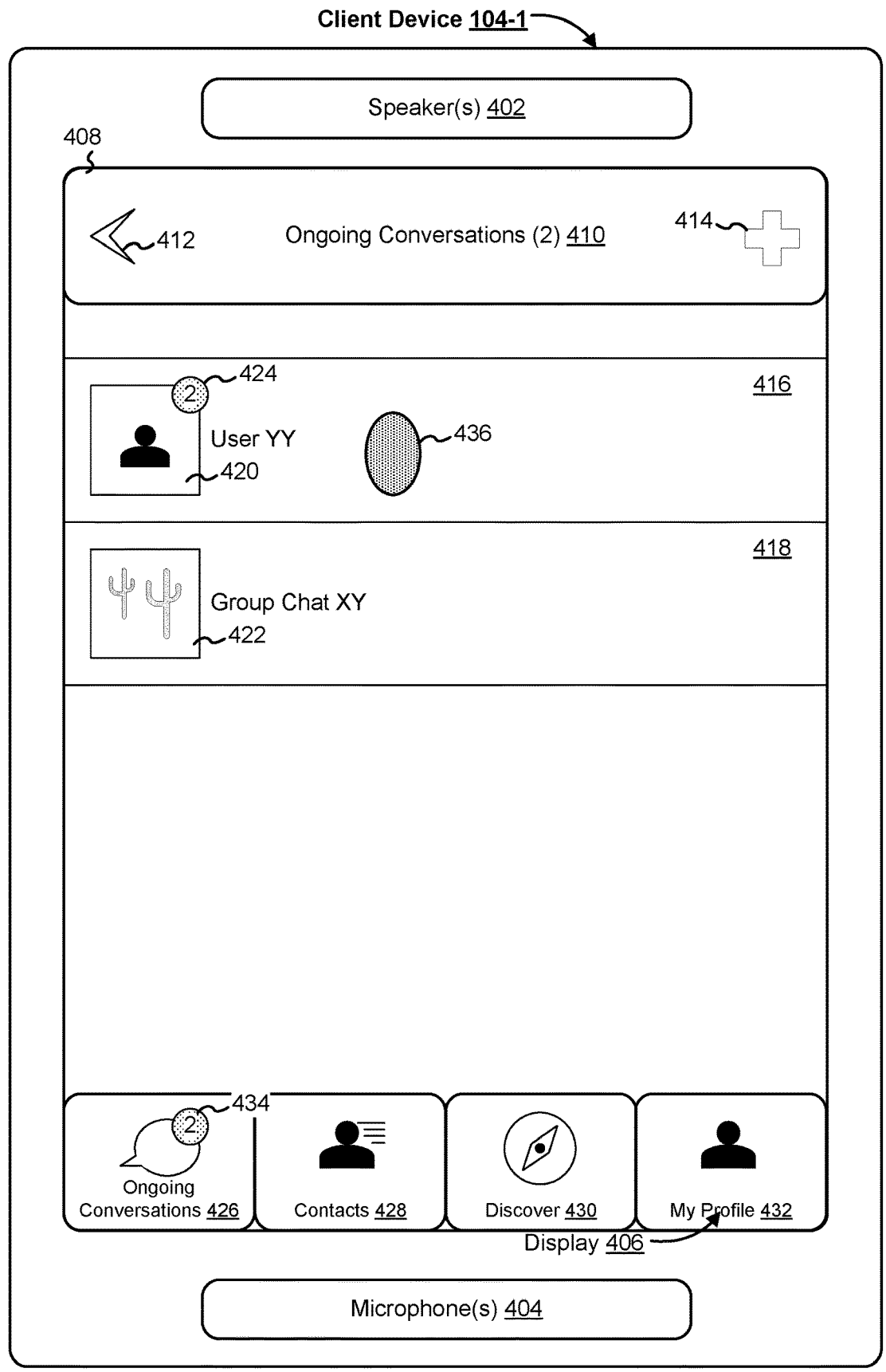
FIGS. 4A-4N illustrate exemplary user interface for facilitating real-time location sharing in accordance with some embodiments.

Attention is now directed towards embodiments of user interfaces and associated processes that may be implemented on client devices 104-1, 104-2 with zero or more speakers 402, zero or more microphones 404, and a display 406. For example, display 406 is a touch screen (sometimes also herein called a "touch screen display") enabled to receive one or more contacts and display information (e.g., media content, websites and web pages thereof, and/or user interfaces for application(s) 326 or the social networking platform). FIGS. 4A-4N illustrate exemplary user interfaces for facilitating real-time location sharing in accordance with some embodiments.

Although some of the examples that follow will be given with reference to inputs on a touch screen (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to contacts (e.g., finger inputs such as finger contacts, finger tap gestures, finger swipe gestures, etc.), it should be understood that, in some embodiments, one or more of the contacts are replaced with input from another input device (e.g., a mouse-based, stylus-based, or physical button-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact) or depression of a physical button. Similarly, when multiple user inputs are simultaneously detected, it should be understood that multiple computer mice are, optionally, used simultaneously, or a mouse and finger contacts are, optionally, used simultaneously.

FIGS. 4A-4F show user interface 408 displayed on a first client device 104-1 (e.g., a mobile phone associated with a first user such as user XX); however, one skilled in the art will appreciate that the user interfaces shown in FIGS. 4A-4F may be implemented on other similar computing devices. FIGS. 4G-4N show user interface 4100 displayed on a second client device 104-2 (e.g., a mobile phone associated with a second user such as user YY); however, one skilled in the art will appreciate that the user interfaces shown in FIGS. 4G-4N may be implemented on other similar computing devices. The user interfaces in FIGS. 4A-4N are used to illustrate the processes described herein, including the methods and processes described with respect to FIGS. 5-8 and 9A-9D.

FIG. 4A illustrates first client device 104-1 displaying an ongoing conversations interface 410. In FIG. 4A, ongoing conversations interface 410 enables the user of first client device 104-1 (e.g., user XX) to view conversation 416 by performing an operation (e.g., a tap gesture) within the region for conversation 416 or conversation 418 by performing an operation (e.g., a tap gesture) within the region for conversation 418. In FIG. 4A, conversation 416 corresponds to a conversation between user XX and user YY whose avatar 420 is displayed in the region for conversation 416. The region for conversation 416 also includes unread messages indicator 424 indicating that user XX has two unread messages from user YY within conversation 416. In FIG. 4A, conversation 418 corresponds to a group chat with group XY to which user XX is a member. In FIG. 4A, avatar 422 corresponds to group chat XY.

In FIG. 4A, ongoing conversations interface 410 also includes back affordance 412, which, when activated (e.g., with a tap gesture), causes first client device 104-1 to display a previous interface (e.g., a home interface for the social networking platform from which ongoing conversations interface 410 was reached by the user of first client device 104-1) and conversation addition affordance 414, which, when activated (e.g., with a tap gesture), causes first client device 104-1 to display a dialog for initiating a new conversation. In FIG. 4A, ongoing conversations interface 410 further includes: ongoing conversations affordance 426, which, when activated (e.g., with a tap gesture), causes first client device 104-1 to display ongoing conversations interface 410; contacts affordance 428 which, when activated (e.g., with a tap gesture), causes first client device 104-1 to display a contact list corresponding to the user of first client device 104-1; discover affordance 430, which, when activated (e.g., with a tap gesture), enables the user of first client device 104-1 to discover new contacts; and my profile affordance 432 which, when activated (e.g., with a tap gesture), causes first client device 104-1 to display a profile page corresponding to the user of first client device 104-1 (e.g., user XX). In FIG. 4A, unread messages indicator 434 indicates that user XX has two unread messages among their ongoing conversations. FIG. 4A also illustrates first client device 104-1 detecting contact 436 at a location corresponding to the region for conversation 416.

Figure 4B:
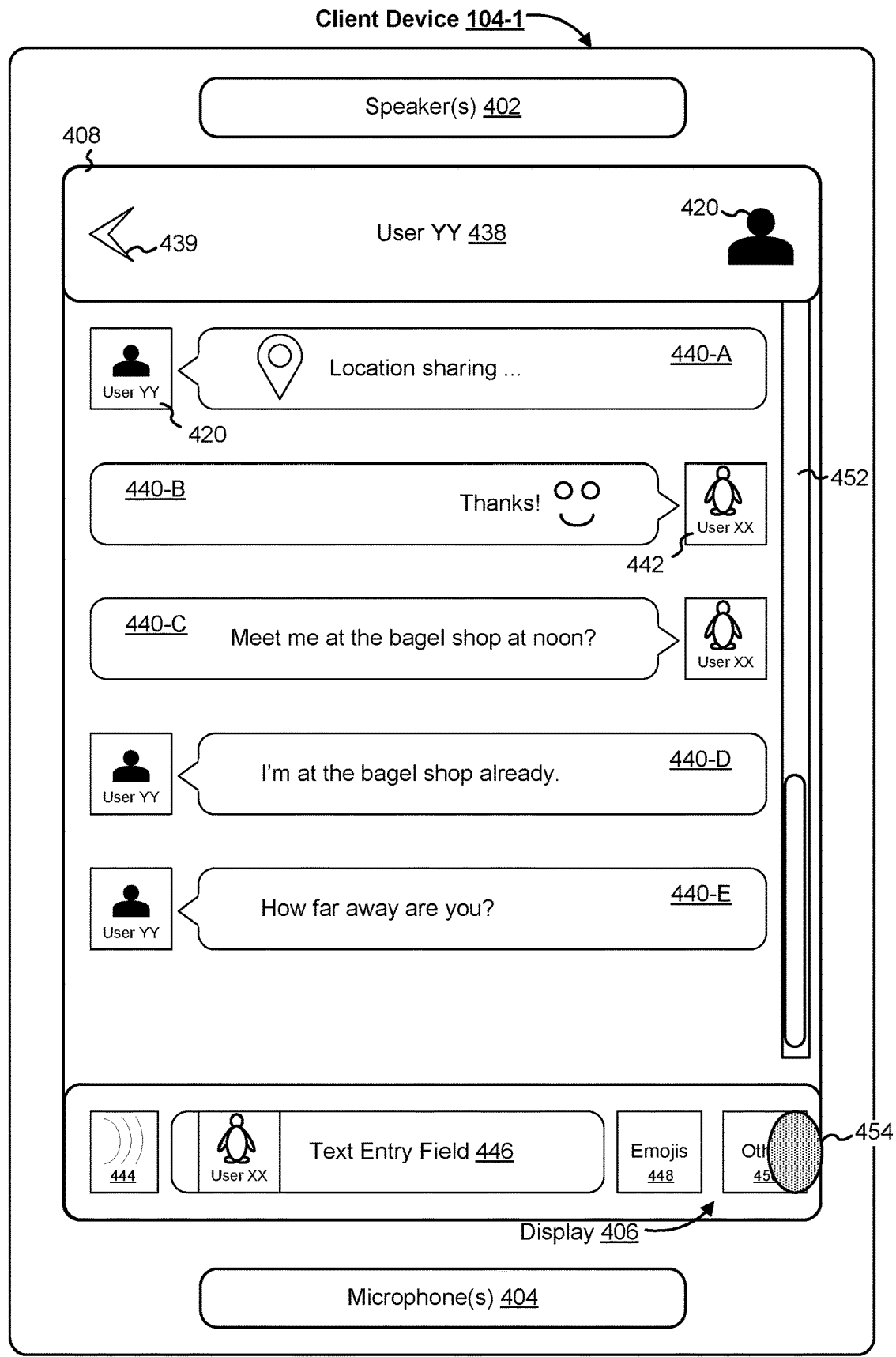

FIG. 4B illustrates first client device 104-1 displaying a chat interface 438 for a conversation between user XX (e.g., the user of first client device 104-1) and user YY (e.g., the user of second client device 104-2) in response detecting selection of the region for conversation 416 in FIG. 4A. In FIG. 4B, chat interface 438 includes back affordance 439, which, when activated (e.g., with a tap gesture), causes first client device 104-1 to display a previous interface (e.g., ongoing conversations interface 410 in FIG. 4A) and avatar 420 corresponding to user YY. In FIG. 4B, chat interface 438 also includes a plurality of messages between user XX and user YY including messages 440-A, 440-D, and 440-E sent by user YY as indicated by avatar 420 adjacent to messages 440-A, 440-D, and 440-E and messages 440-B and 440-C sent by user XX as indicated by avatar 442 adjacent to messages 440-B and 440-C. In FIG. 4B, chat interface 438 further includes: affordance 444 for recording a voice message to be sent to user YY within chat interface 438; text entry field 446 for entering a text message to be sent to user YY within chat interface 438; emojis affordance 448, which, when activated (e.g., with a tap gesture), causes first client device 104-1 to display a plurality of emojis for sending to user YY within chat interface 438; and other features affordance 450, which, when activated (e.g., with a tap gesture), causes first client device 104-1 to display a plurality of other features (e.g., features panel 456 with features 458 in FIG. 4C). In FIG. 4B, chat interface 438 further includes scroll bar 452 for displaying older messages sent between user XX and user YY. FIG. 4B also illustrates first client device 104-1 detecting contact 454 at a location corresponding to other features affordance 450.

Figure 4C:
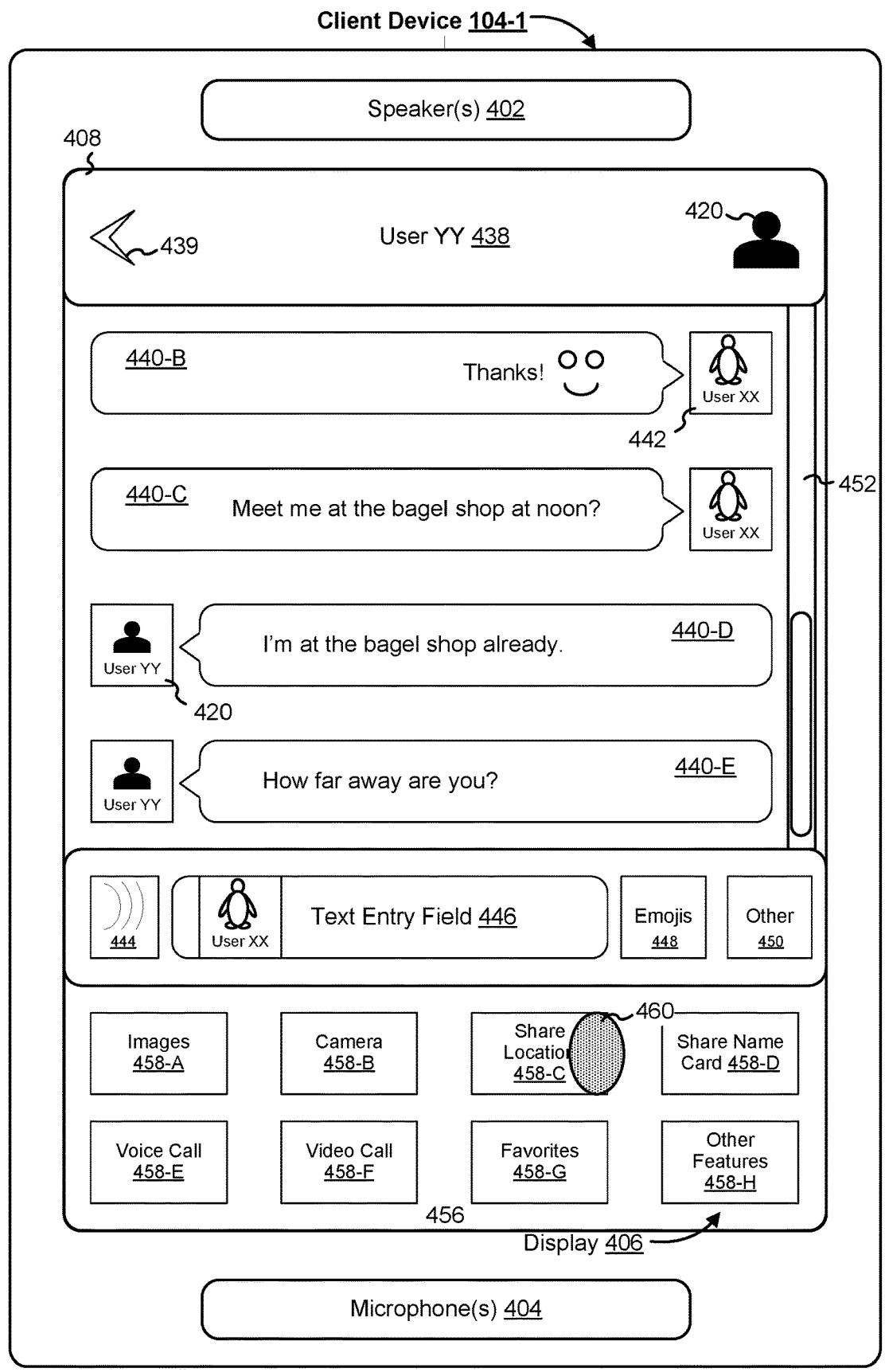

FIG. 4C illustrates first client device 104-1 displaying features panel 456 within chat interface 438 in response to detecting selection of other features affordance 450 in FIG. 4B. In FIG. 4C, features panel 456 enables the user of first client device 104-1 (e.g., user XX) to perform a plurality of features and/or functions within chat interface 438. In FIG. 4C, features panel 456 includes: images affordance 458-A for accessing images previously captured or saved by the user of first client device 104-1 for sending to user YY within chat interface 438; camera affordance 458-B for capturing an image for sending to user YY within chat interface 438; share location affordance 458-C for sharing the location of first client device 104-1 with user YY within chat interface 438; share name card affordance 458-D for sharing user XX's name card with user YY within chat interface 438; voice call affordance 458-E for initiating a voice call with user YY (e.g., via VOIP or a cellular network); video call affordance 458-F for initiating a video call with user YY; favorites affordance 458-G for selecting among a plurality of user XX's most frequently used features; and other features affordance 458-H for displaying other features and/or functions of the social networking platform. FIG. 4C also illustrates first client device 104-1 detecting contact 460 at a location corresponding to share location affordance 458-C.

Figure 4D:
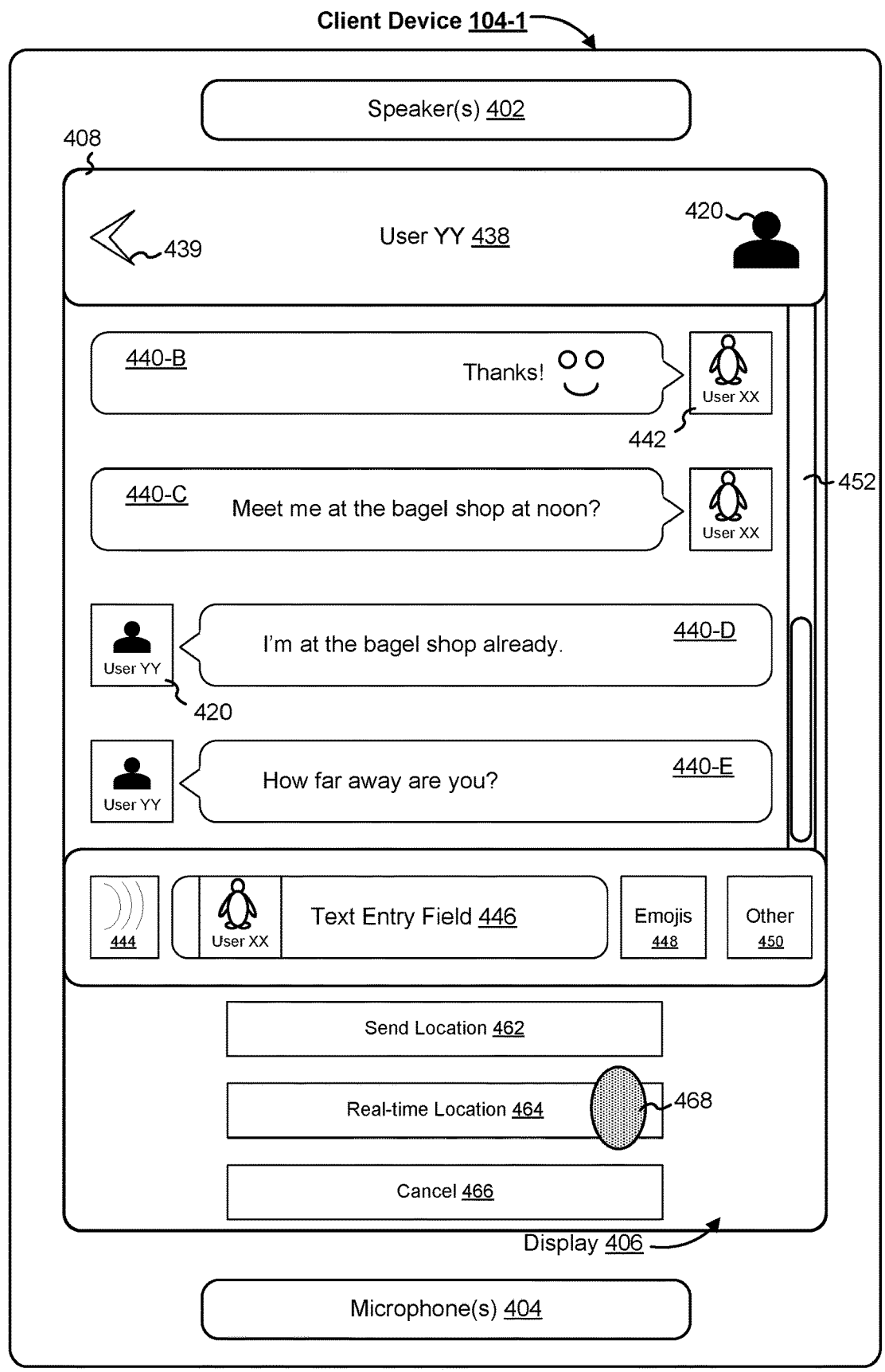

FIG. 4D illustrates first client device 104-1 displaying options for sharing the location of first client device 104-1 with user YY within chat interface 438 in response to detecting selection of share location affordance 458-C in FIG. 4C. In FIG. 4D, the options for sharing the location of first client device 104-1 include: a send location affordance 462 for sending user YY the instantaneous location of first client device 104-1 within chat interface 438; a real-time location affordance 464 for sharing the real-time location of first client device 104-1 with user YY within chat interface 438; and cancel affordance 466, which, when activated (e.g., with a tap gesture), causes first client device 104-1 to display a previous interface (e.g., chat interface 438 in FIG. 4B). FIG. 4D also illustrates first client device 104-1 detecting contact 468 at a location corresponding to real-time location affordance 464. In some embodiments, in response to detecting selection of real-time location affordance 464, first client device 104-1 causes a location sharing request (via server system 108) to be sent to user XX including a message (e.g., message 440-F in FIG. 4G) to view the location of user XX and/or share his/her own location with user XX.

Figure 4E:
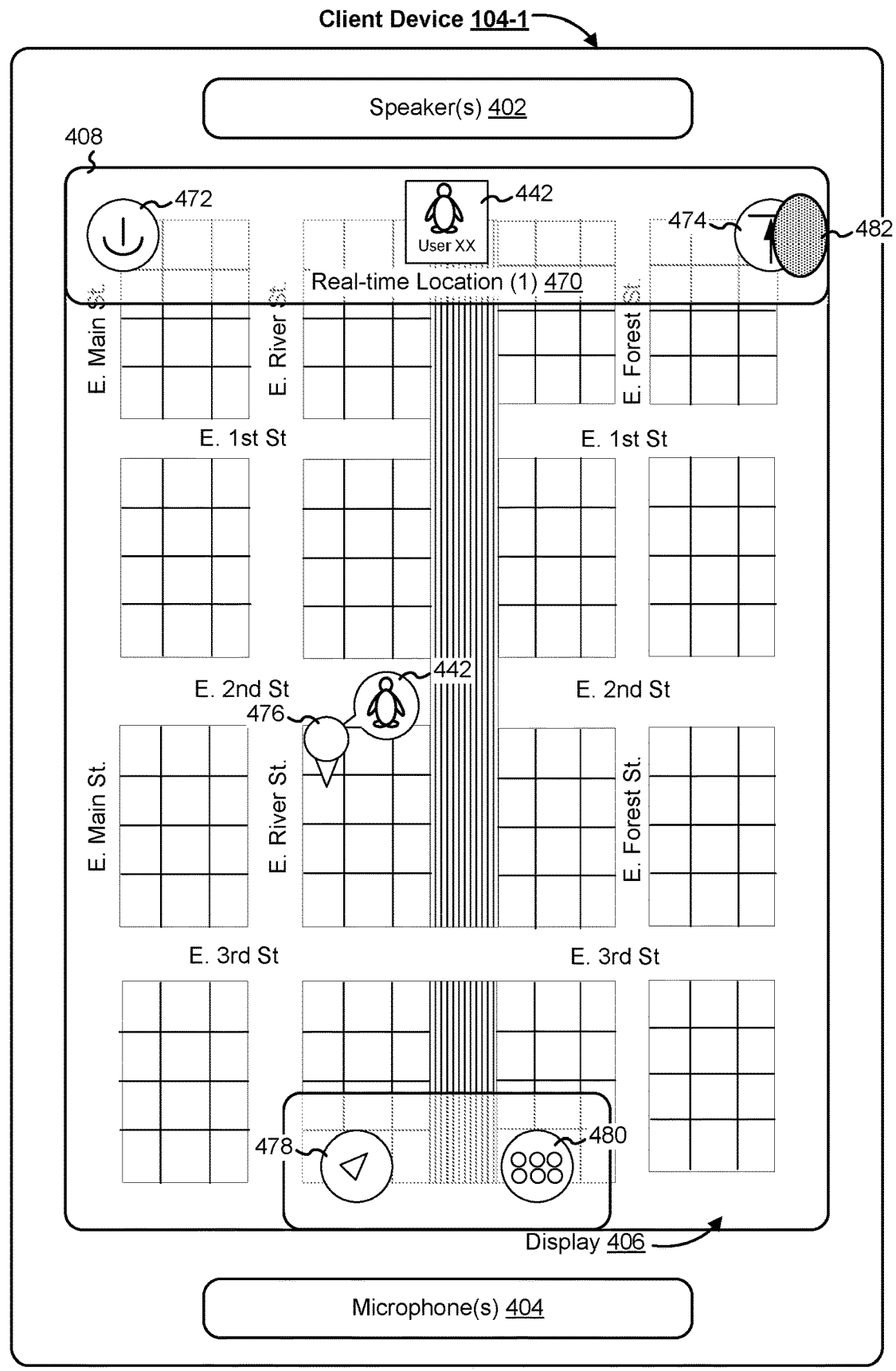

FIG. 4E illustrates first client device 104-1 displaying a location interface in response to detecting selection of real-time location affordance 464 in FIG. 4D. In FIG. 4E, the location interface includes a map with a first indicator 476 showing the real-time location of user XX and avatar 442 for user XX indicating that first indicator 476 corresponds to user XX. In some embodiments, the user of first client device 104-1 is able to adjust the map by performing dragging gestures so as to scan northwards, southwards, etc. In FIG. 4E, the location interface also includes region 470 indicating that user XX is currently sharing his/her location (as indicated by the presence of avatar 442 in region 470) along with (A) affordance 472, which, when activated (e.g., with a tap gesture), causes first client device 104-1 to exit real-time location sharing and (B) affordance 474, which, when activated (e.g., with a tap gesture), causes first client device 104-1 to switch to chat interface 438 (e.g., as shown in FIG. 4B). In FIG. 4E, the location interface further includes affordance 478 for re-orienting the map to its original orientation (e.g., with first indicator 476 as its center) and affordance 480, which, when activated (e.g., with a press and hold gesture), causes first client device 104-1 to transmit the voice of the user of client device 104-1 to other uses who also are sharing their real-time location as long as the user holds contact with affordance 480 (e.g., like a walkie-talkie). FIG. 4E also illustrates first client device 104-1 detecting contact 482 at a location corresponding to affordance 474.

Figure 4F:
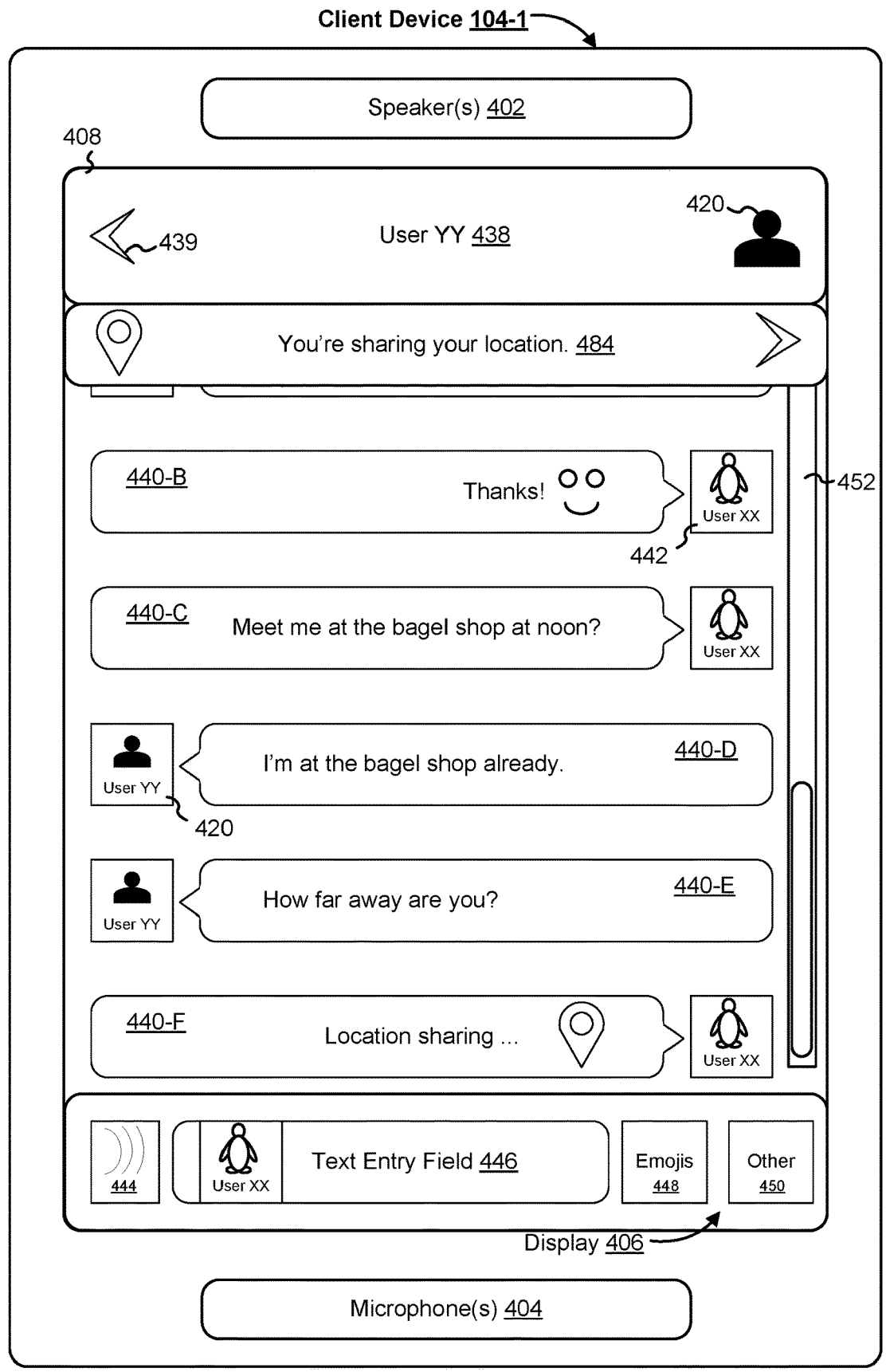

FIG. 4F illustrates first client device 104-1 displaying chat interface 438 for the conversation between user XX (e.g., the user of first client device 104-1) and user YY (e.g., the user of second client device 104-2) in response detecting selection of affordance 474 in FIG. 4E. In FIG. 4F, interface 438 includes message 440-F (e.g., a location sharing request) sent in user YY in response to detecting selection of real-time location affordance 464 in FIG. 4D. For example, message 440-F indicates that user XX is sharing his/her location with user YY. In FIG. 4F, interface 438 also includes location sharing status banner 484 indicating that user XX is sharing his/her location with user YY.

Figure 4G:
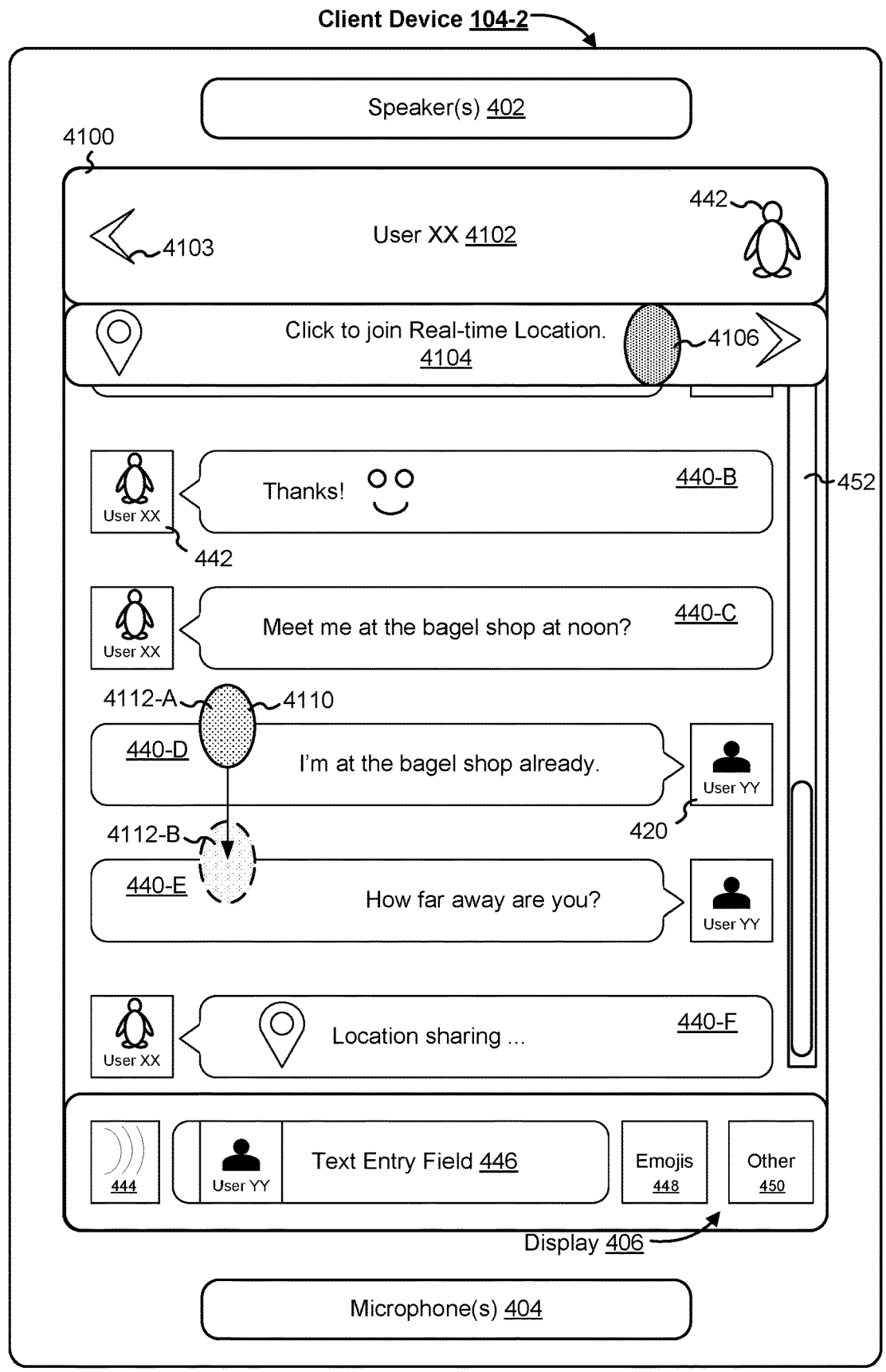

FIG. 4G illustrates second client device 104-2 displaying a chat interface 4102 between user YY (e.g., the user of second client device 104-2) and user XX (e.g., the user of first client device 104-1). In FIG. 4G, chat interface 4102 includes back affordance 4103, which, when activated (e.g., with a tap gesture), causes second client device 104-2 to display a previous interface and avatar 442 corresponding to user XX. In FIG. 4G, chat interface 4102 also includes a plurality of messages between user YY and user XX including messages 440-A, 440-D, and 440-E sent by user YY as indicated by avatar 420 adjacent to messages 440-A, 440-D, and 440-E and messages 440-B, 440-C, and 440-F sent by user XX as indicated by avatar 442 adjacent to messages 440-B, 440-C, and 440-F. In FIG. 4G, chat interface 4102 further includes: affordance 444 for recording a voice message to be sent to user XX within chat interface 4102; text entry field 446 for entering a text message to be sent to user XX within chat interface 4102; emojis affordance 448, which, when activated (e.g., with a tap gesture), causes second client device 104-2 to display a plurality of emojis for sending to user XX within chat interface 4102; and other features affordance 450, which, when activated (e.g., with a tap gesture), causes second client device 104-2 to display a plurality of other features (e.g., features panel 456 with features 458 in FIG. 4C). In FIG. 4G, chat interface 4102 further includes scroll bar 452 for displaying older messages sent between user YY and user XX.

In FIG. 4G, chat interface 4102 further includes location sharing status banner 4104 indicating that user XX has shared his/her real-time location with user YY and further prompts user YY to share his/her real-time location with user XX. In FIG. 4G, location sharing status banner 4104 is displayed with a first display characteristic (e.g., a gray background) indicating that user YY has not shared his/her location. FIG. 4G also illustrates second client device 104-2 detecting contact 4106 at a location corresponding to location sharing status banner 4104. As an alternative, FIG. 4G also illustrates second client device 104-2 detecting a downwards dragging gesture with contact 4110 moving from location 4112-A to location 4112-B.

Figure 4H:
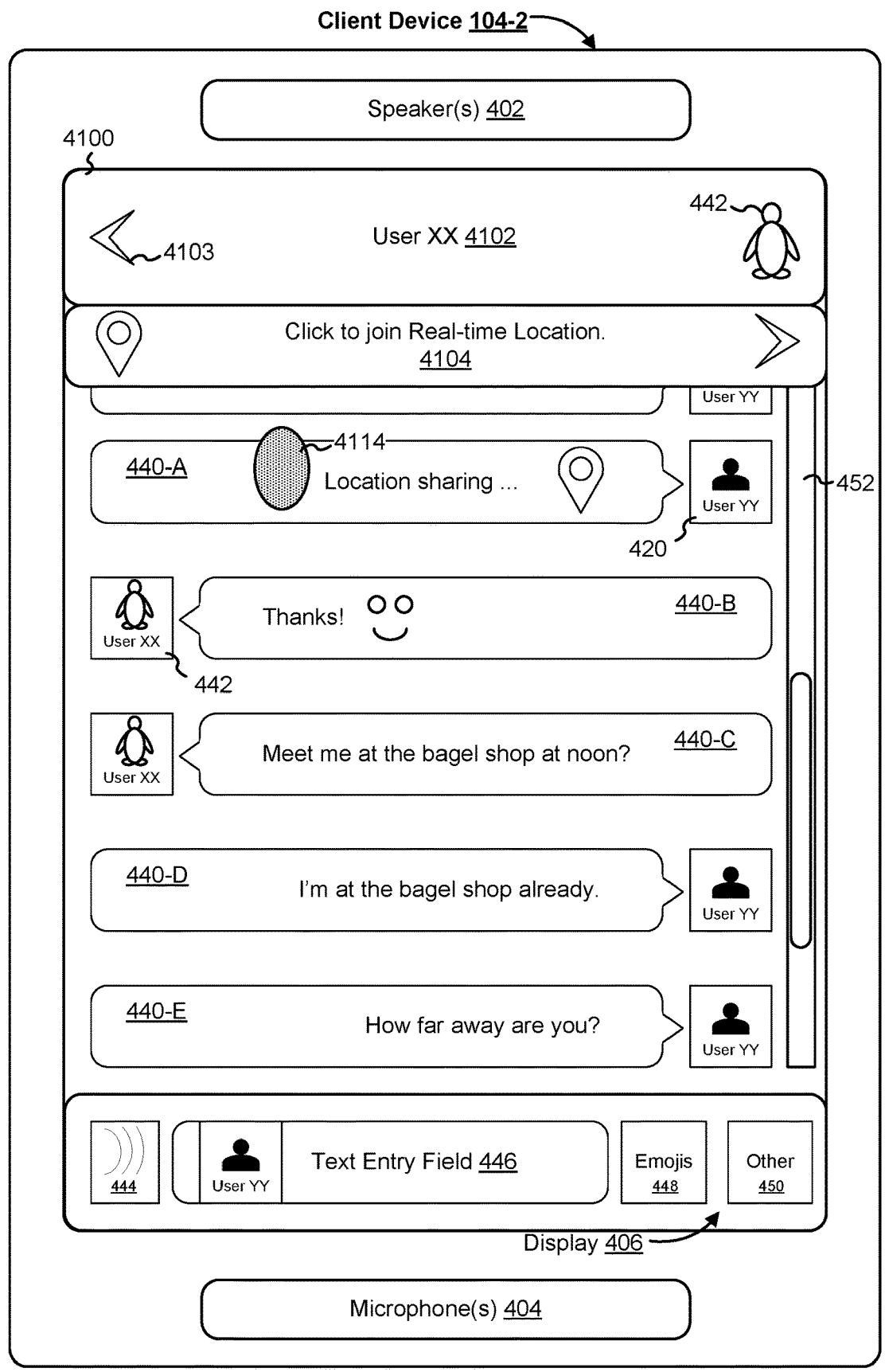

FIG. 4H illustrates second client device 104-2 displaying chat interface 4102 with at least one message not displayed in FIG. 4G in response to detecting the downwards dragging gesture to scroll chat interface 4102 in FIG. 4G. FIG. 4H also illustrates second client device 104-2 detecting contact 4114 at a location corresponding to message 440-A (e.g., an old location sharing request).

Figure 4I:
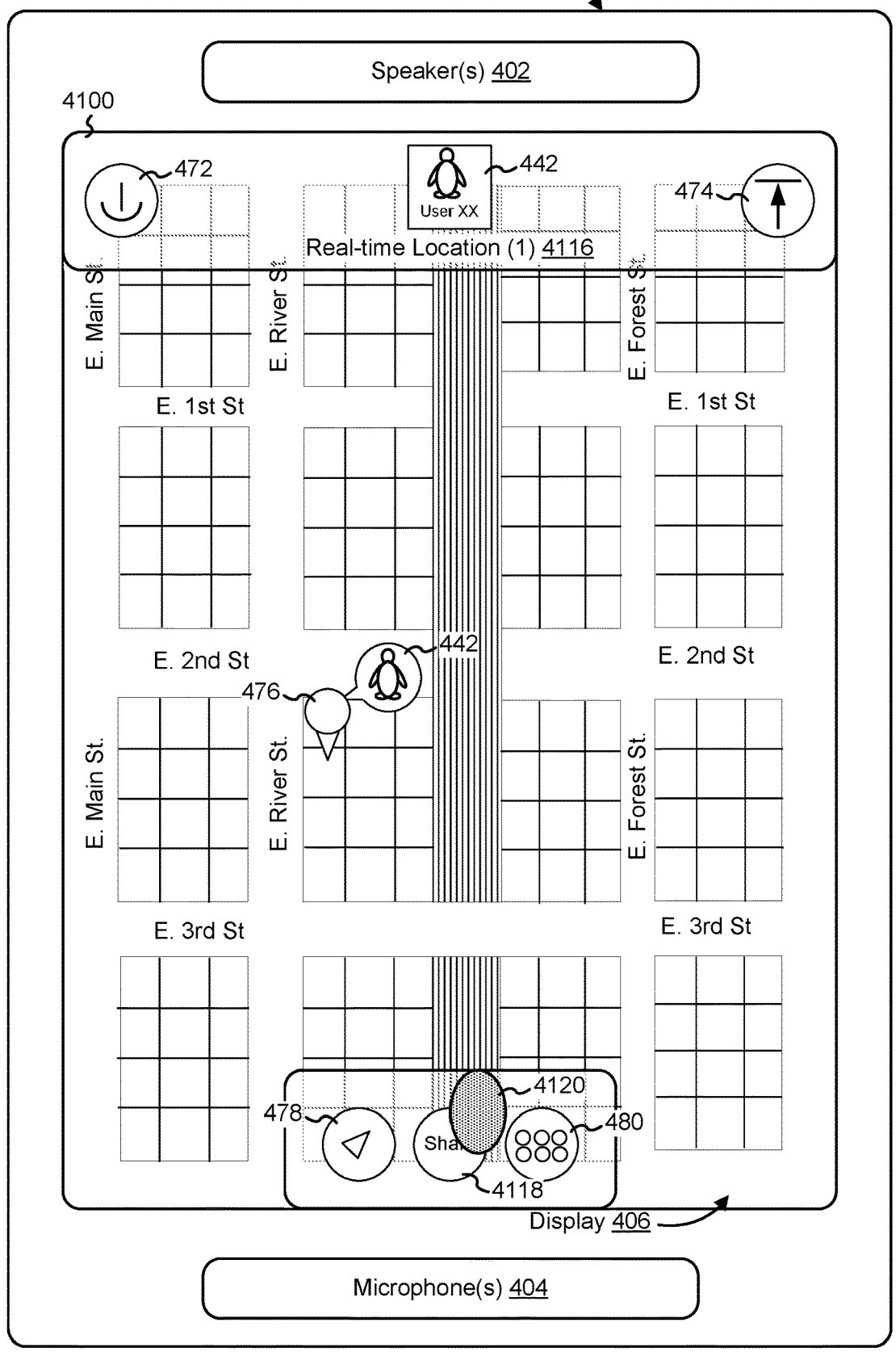

FIG. 4I illustrates second client device 104-2 displaying a location interface in response to detecting selection of location sharing status banner in FIG. 4G or message 440-A in FIG. 4H. In FIG. 4I, the location interface includes a map with a first indicator 476 showing the real-time location of user XX and avatar 442 for user XX indicating that first indicator 476 corresponds to user XX. In some embodiments, the user of second client device 104-2 is able to adjust the map by performing dragging gestures so as to scan northwards, southwards, etc. In FIG. 4I, the location interface also includes region 4116 indicating that user XX is currently sharing his/her location (as indicates by the presence of avatar 442 in region 4116) along with (A) affordance 472, which, when activated (e.g., with a tap gesture), causes second client device 104-2 to exit real-time location sharing and (B) affordance 474, which, when activated (e.g., with a tap gesture), causes second client device 104-2 to switch to chat interface 4102 (e.g., as shown in FIG. 4G). In FIG. 4I, the location interface further includes: affordance 478 for re-orienting the map to its original orientation (e.g., with first indicator 476 as its center); affordance 480, which, when activated (e.g., with a press and hold gesture), causes first client device 104-1 to transmit the voice of the user of client device 104-1 to other uses who also are sharing their real-time location as long as the user holds contact with affordance 480 (e.g., like a walkie-talkie); and share affordance 4118 for sharing the real-location of second client device 104-2 with user XX. FIG. 4I also illustrates second client device 104-2 detecting contact 4120 at a location corresponding to share affordance 4118.

Figure 4J:
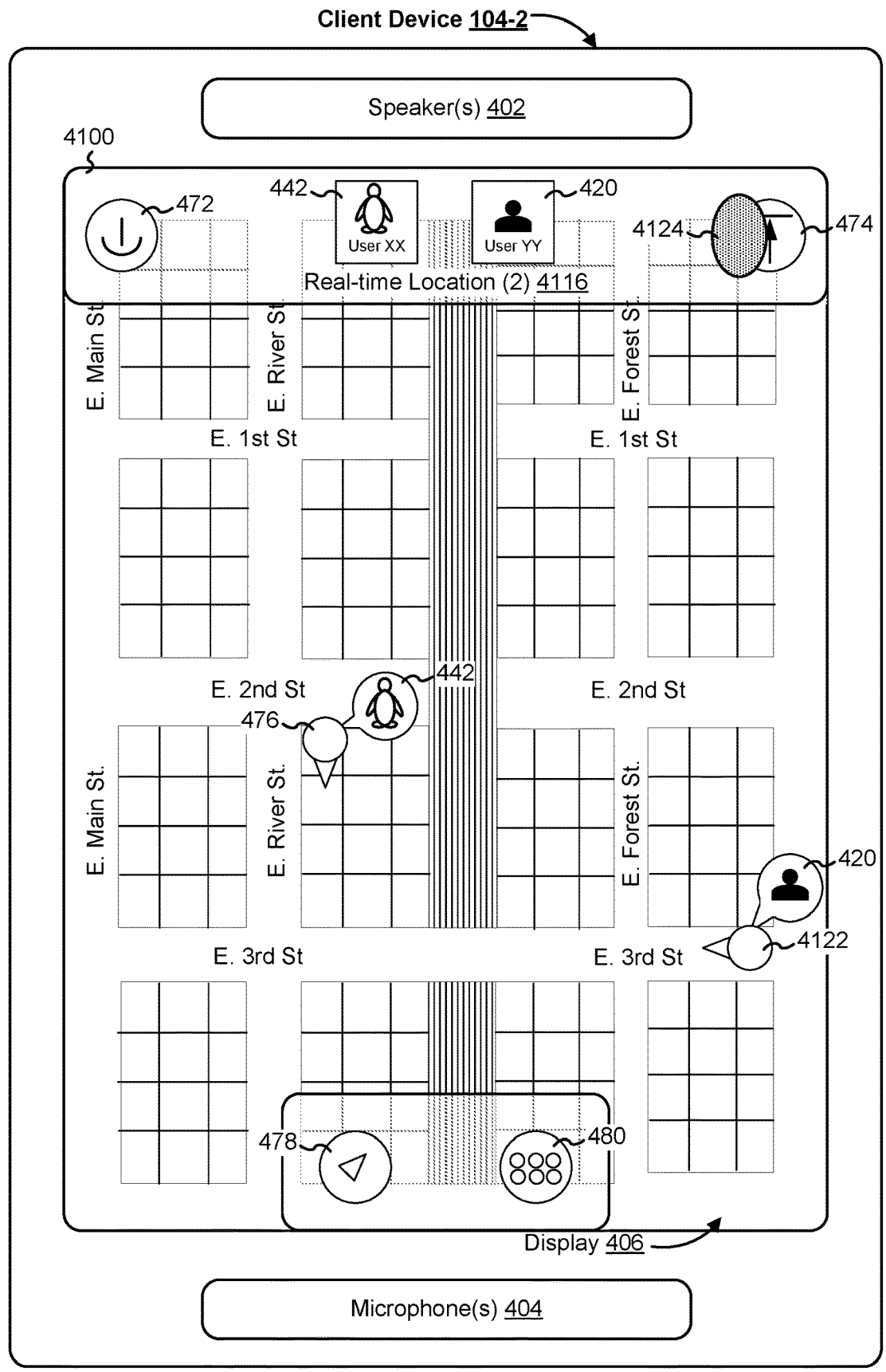

FIG. 4J illustrates second client device 104-2 displaying the location interface in response to detecting selection of location sharing status banner in FIG. 4G, message 440-A in FIG. 4H, or share affordance 4118 in FIG. 4I. In FIG. 4J, the location interface includes the map with (A) first indicator 476 showing the real-time location of user XX and avatar 442 for user XX indicating that first indicator 476 corresponds to user XX and (B) second indicator 4122 showing the real-time location of user YY and avatar 420 for user YY indicating that first indicator 4122 corresponds to user YY. In FIG. 4J, the location interface also includes region 4116 indicating that user XX is currently sharing his/her location (as indicated by the presence of avatar 442 in region 4116) and that user YY is currently sharing his/her location (as indicated by the presence of avatar 420 in region 4116). FIG. 4J also illustrates second client device 104-2 detecting contact 4124 at a location corresponding to affordance 474.

Figure 4K:
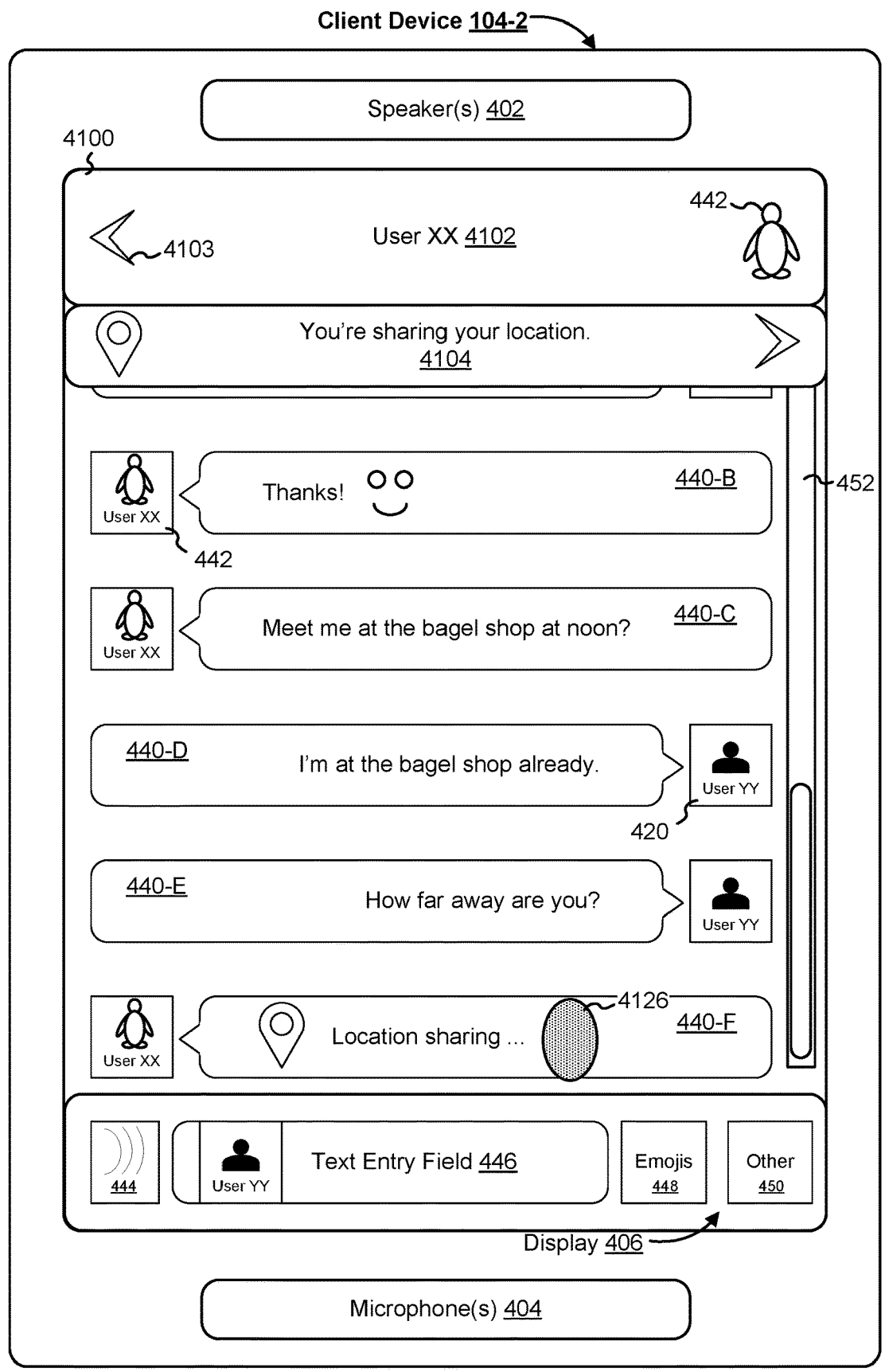

FIG. 4K illustrates second client device 104-1 displaying chat interface 4102 for the conversation between user YY (e.g., the user of second client device 104-2) and user XX (e.g., the user of first client device 104-1) in response to detecting selection of affordance 474 in FIG. 4J. In FIG. 4K, location sharing status banner 4104 indicates that user YY is sharing his/her real-time location with user XX. In FIG. 4K, location sharing status banner 4104 is displayed with a second display characteristic (e.g., a green background) indicating that user YY has shared his/her location. FIG. 4K also illustrates second client device 104-2 detecting contact 4126 at a location corresponding to message 440-F (e.g., the most recent location sharing request).

Figure 4L:
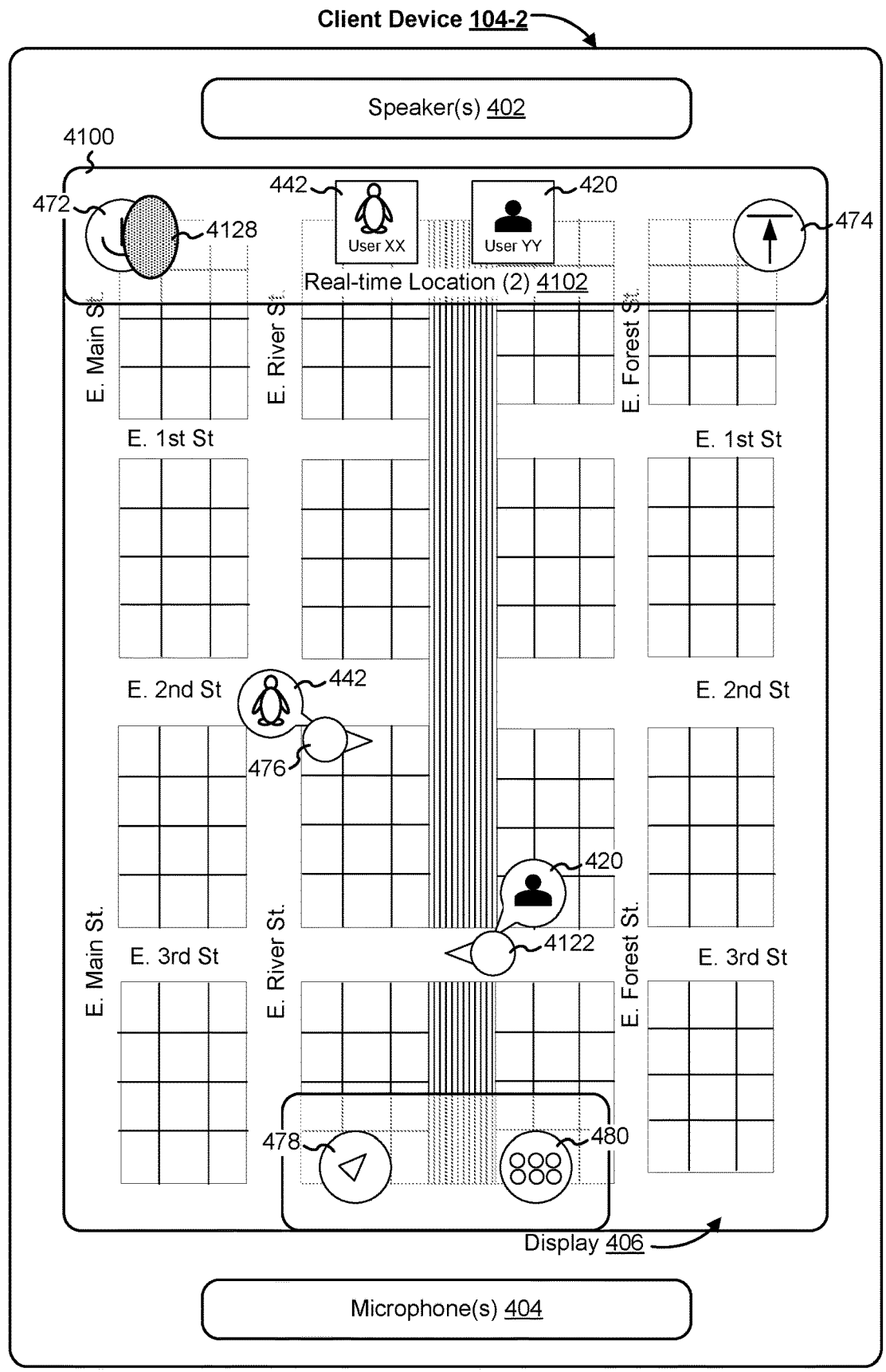

FIG. 4L illustrates second client device 104-2 displaying the location interface in response to detecting selection of message 440-F in FIG. 4K. FIG. 4L also illustrates second client device 104-2 detecting contact 4128 at a location corresponding to affordance 472.

Figure 4M:
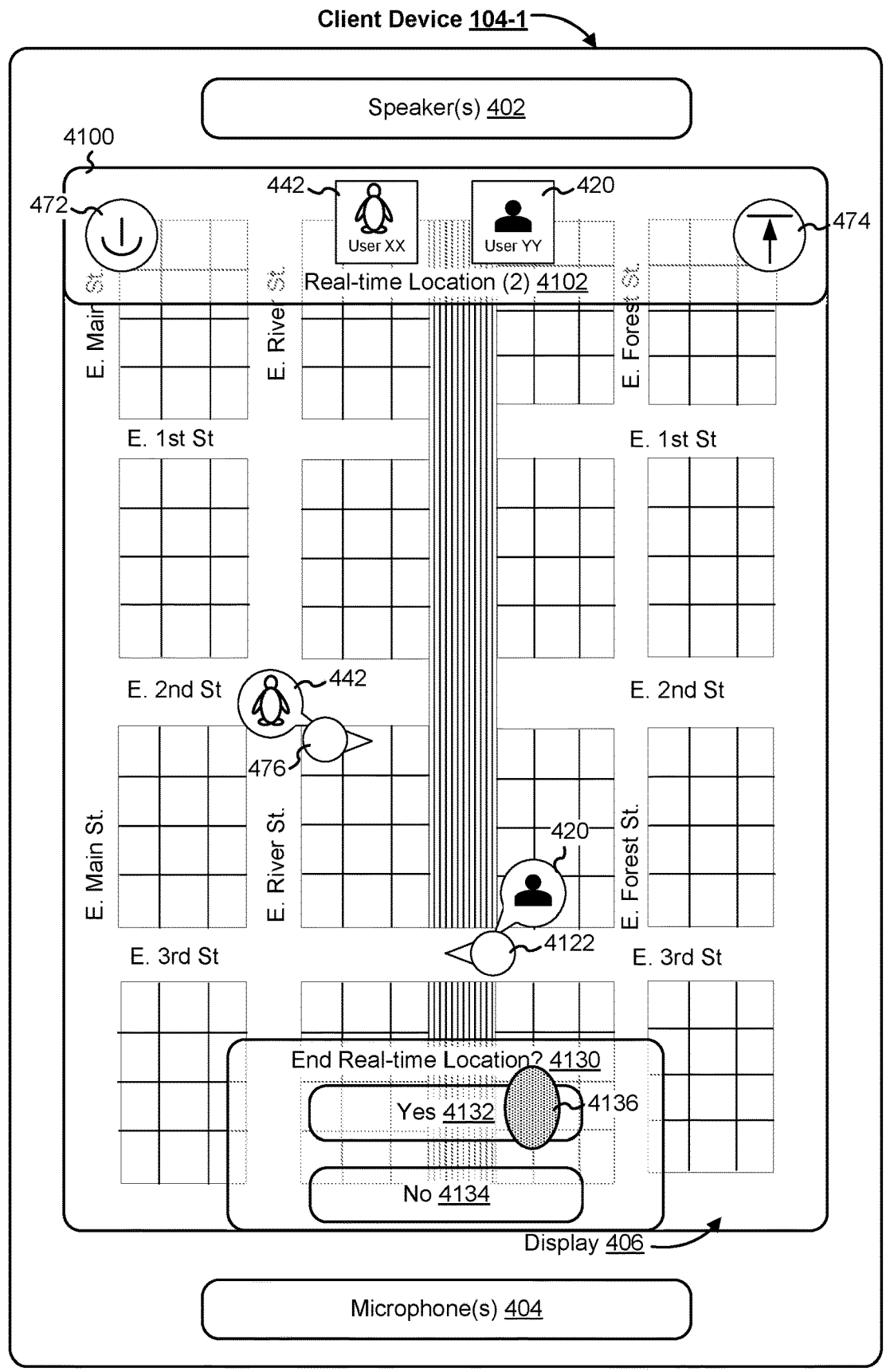
Figure 4N:
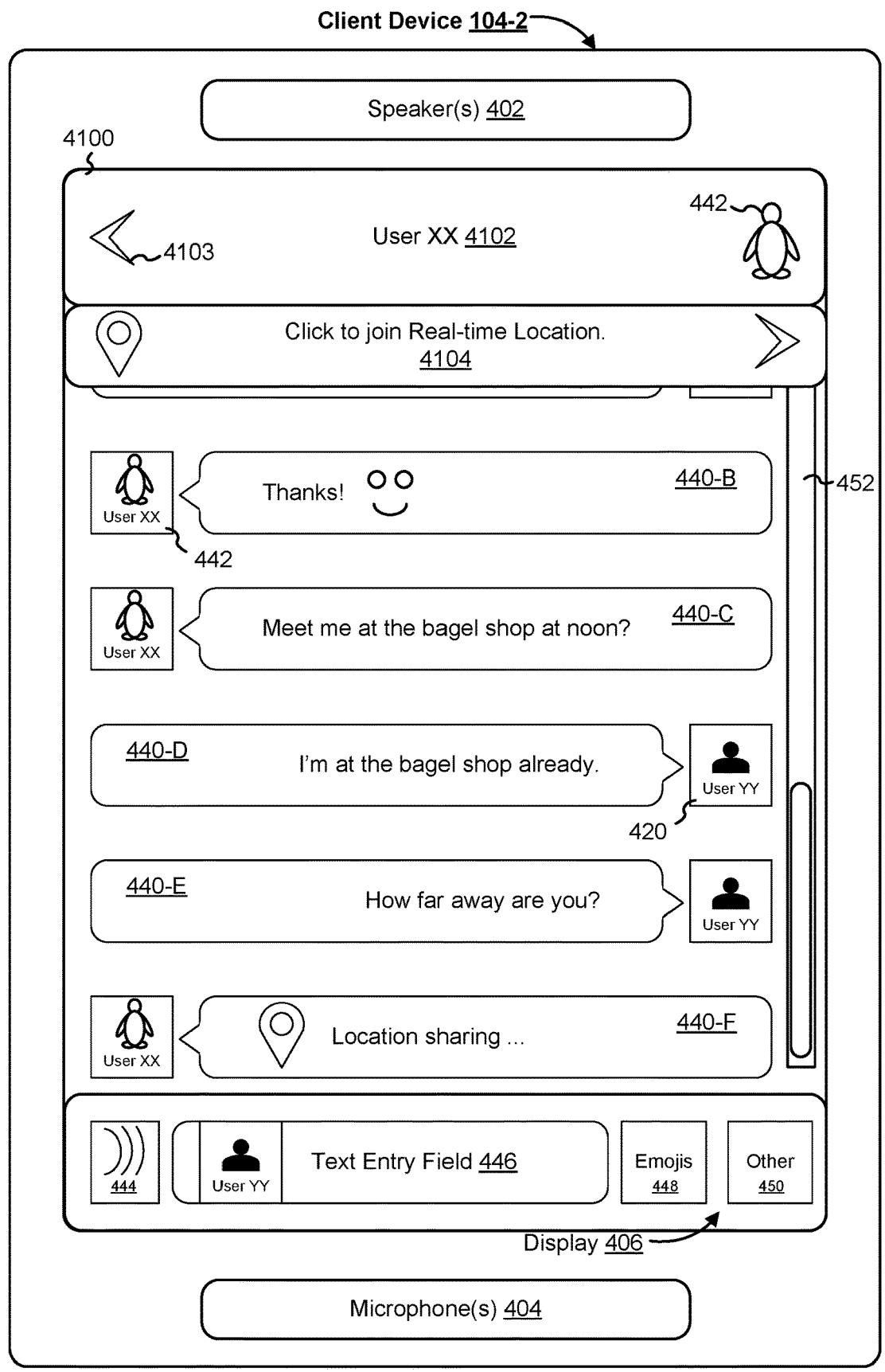

FIG. 4M illustrates second client device 104-2 displaying prompt 4130 in response to detecting selection of affordance 472 in FIG. 4L. In FIG. 4M, prompt 4130 includes a "Yes" affordance 4132 which enables the user of second client device 104-2 to confirm that he/she wishes to exit real-time location sharing and a "No" affordance 4134 which enables the user of second client device 104-2 to not exit real-time location sharing. FIG. 4M also illustrates second client device 104-2 detecting contact 4136 at a location corresponding to "Yes" affordance 4132.

FIG. 4N illustrates second client device 104-1 displaying chat interface 4102 for the conversation between user YY (e.g., the user of second client device 104-2) and user XX (e.g., the user of first client device 104-1) in response to detecting selection of "Yes" affordance 4132. In FIG. 4N, location sharing status banner 4104 indicates that user XX has shared his/her real-time location with user YY and further prompts user YY to share his/her real-time location with user XX.

Figure 5:
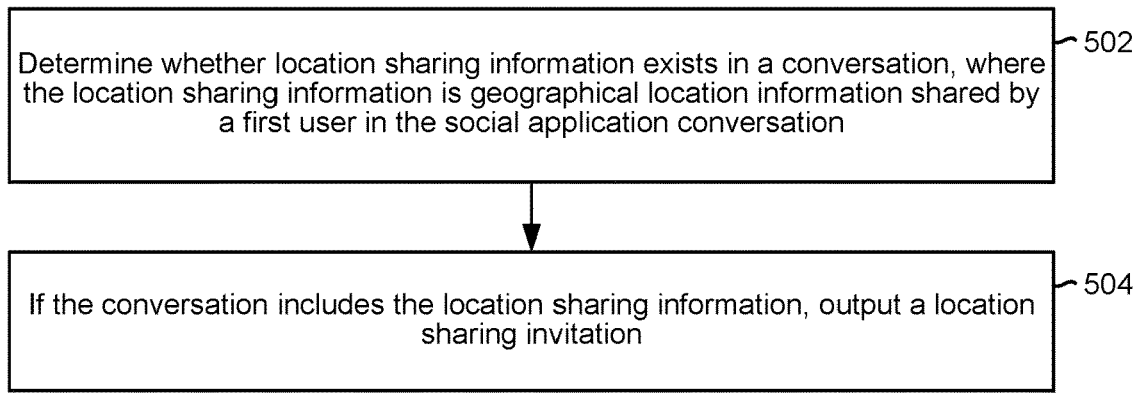
FIG. 5 illustrates a flowchart diagram of a method of location sharing in accordance with some embodiments.

FIG. 5 illustrates a flowchart diagram of a method 500 of location sharing in accordance with some embodiments. In some embodiments, method 500 is performed by a computing device with one or more processors and memory. For example, in some embodiments, method 500 is performed by client device 104 (FIGS. 1 and 3) or a component thereof (e.g., client-side module 102, FIGS. 1 and 3). In some embodiments, method 500 is governed by instructions that are stored in a non-transitory computer readable storage medium and the instructions are executed by one or more processors of the terminal.

In some embodiments, data processing for a social networking platform is implemented in client-server environment 100 (FIG. 1) with a server system 108 and client-side module 102 executed on one or more client devices 104 (e.g., a first client device 104-1 associated with a first user (user XX) and a second client device 104-2 associated with a second user (user YY)). In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

In some embodiments, the computing device determines (502) whether location sharing information exists in a conversation, where the location sharing information is geographical location information shared by a first user in the social application. The conversation may be an instant messaging conversation between two or more users within a social application. If the first user initiates geographical location sharing, the computing device may detect geographical location sharing information. The geographical location sharing information is the geographical location information shared by the first user, and the geographical location sharing information may prompt the user of the computing device (i.e., the second user) to share geographical location information. The shared geographical location information may directly display geographical location of the first user, or may only prompt the user of the computing device to share geographical location information.

When initiating geographical location sharing, the first user can perform geographical location sharing through a function menu of their respective computing device. For example, during a conversation between user A and user B, user A initiates geographical location information sharing through a function menu of the conversation. The computing device of user B detects the geographical location sharing information from user A. Similarly, when the conversation is a group conversation with more than two users, any user of the multiple users can initiate geographical location information sharing. For example, FIGS. 4A-4J show the first user of first client device 104-1 (e.g., user XX) sending a location-sharing request to the second user of second client device 104-2 through chat interface 438 of the social networking platform, where chat interface 438 corresponds to the conversation between user XX and user YY.

In some embodiments, if the conversation includes the location sharing information, the computing device outputs (504) a location sharing invitation. After the geographical location sharing information in the conversation is detected, geographical location sharing invitation is output to remind the user of the computing device that the first user has already performed geographical location sharing and to prompt the user of the computing device (i.e., the second user) to share the geographical location information. The first user is a sharer that initiates geographical location sharing, and the second user is any user with whom the geographical location is shared. FIG. 4G, for example, shows second client device 104-2 displaying chat interface 4102 with message 440-F indicating that user XX (i.e., the first user) has shared his/her real-time location with user YY (i.e., the second user). In FIG. 4G, chat interface 4102 also includes location sharing status banner 4104 indicating that user XX (i.e., the first user) has shared his/her real-time location with user YY (i.e., the second user) and further prompts user YY to share his/her real-time location with user XX.

In the foregoing embodiment, the geographical location information shared by the first user is detected and geographical location sharing invitation is output, the second user is invited to participate in geographical location information sharing, and the first user can invite another user by sharing the geographical location information to participate in the geographical location information sharing. As such, the geographical location information sharing between the first user and the second user is no longer an instantaneous action, instead the first user and the second user interact with each other to perform geographical location information sharing, thereby solving the problem of a single form in which geographical location information sharing is performed in the prior art, and providing more diversified forms in which the user performs geographical location information sharing.

After the geographical location sharing invitation is output, the second user can choose to ignore the invitation, reject the invitation, or accept the invitation. When expecting the first user to view location information of the second user, the second user accepts the geographical location sharing invitation of the first user, and before performing geographical location information sharing, the second user chooses whether to perform geographical location information sharing. This ensures the security of private information of the second user.

Preferably, after the geographical location sharing invitation information is output, geographical location information shared by the second user based on the geographical location sharing invitation information is acquired. After the geographical location sharing invitation is output, if the second user accepts the geographical location sharing invitation of the first user, the second user shares the geographical location information. Because the second user performs geographical location sharing based on the geographical location sharing invitation of the first user, the second user can participate in geographical location sharing initiated by the first user, that is, the first user can view the geographical location information of the second user, and the second user can also view the geographical location information of the first user.

If the second user does not accept the invitation for geographical location sharing, the geographical location sharing information of the second user does not need to be acquired. For example, after user A initiates geographical location sharing, the output geographical location sharing invitation reminds the user B to participate in geographical location sharing, and user B can choose to reject or ignore the geographical location sharing invitation, and can also choose to participate in geographical location sharing in multiple ways. Before user B accepts the geographical location sharing invitation, user A cannot view the geographical location of the second user, and user B may view the geographical location of user A, or may not view the geographical location of user A, and after user B user participates in the geographical location sharing, user A and user B can view the geographical location of each other.

The geographical location information shared by the second user based on the geographical location sharing invitation is acquired, and the second user participates in geographical location sharing, so that when the second user performs geographical location information sharing, not only the geographical location information is shared through the function menu, but also geographical location information sharing is performed through information of the first user, providing more diversified forms in which the second user performs geographical location sharing.

The geographical location information of the second user may be acquired based on the geographical location sharing invitation, and how to acquire the geographical location information of the second user based on the geographical location sharing invitation. The data processing method used for location sharing of the embodiment of the present application is further described in detail below with reference to the accompanying drawings.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600, 700, 800, and 900) are also applicable in an analogous manner to method 500 described above with respect to FIG. 5.

Figure 6:
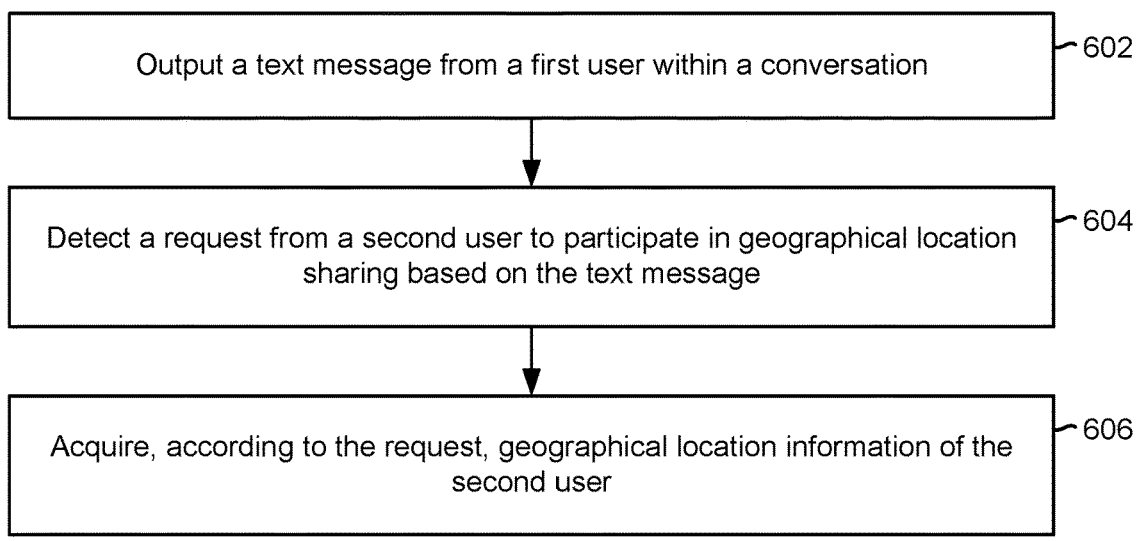
FIG. 6 illustrates a flowchart diagram of a method of location sharing in accordance with some embodiments.

FIG. 6 illustrates a flowchart diagram of a method 600 of location sharing in accordance with some embodiments. In some embodiments, method 600 is performed by a computing device (e.g., associated with a second user) with one or more processors and memory. For example, in some embodiments, method 600 is performed by client device 104 (FIGS. 1 and 3) or a component thereof (e.g., client-side module 102, FIGS. 1 and 3). In some embodiments, method 600 is governed by instructions that are stored in a non-transitory computer readable storage medium and the instructions are executed by one or more processors of the terminal.

In some embodiments, data processing for a social networking platform is implemented in client-server environment 100 (FIG. 1) with a server system 108 and client-side module 102 executed on one or more client devices 104 (e.g., a first client device 104-1 associated with a first user (user XX) and a second client device 104-2 associated with a second user (user YY)). In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

In some embodiments, the computing device outputs (602) a text message from a first user within a conversation. In some embodiments, the output text message is a special text message from the first user that is different from an ordinary message within the conversation as it is presented in a predetermined pattern or has a predetermined identifier for enabling the second user to participate in geographical location sharing based on the special text message. For example, if the output text message is "I [the first user] initiated location sharing," the text message includes an identifier indicates that a "location" is shared to remind the second user to initiate geographical location sharing. FIG. 4G, for example, shows second client device 104-2 displaying chat interface 4102 with message 440-F indicating that user XX (i.e., the first user) has shared his/her real-time location with user YY (i.e., the second user).

In some embodiments, the computing device detects (604) a request from a second user to participate in geographical location sharing based on the test message. For example, the output text message may be used as a function key, the second user clicks the text message as the request to participate in geographical location sharing. FIG. 4K, for example, shows second client device 104-2 detecting contact 4126 at a location corresponding to message 440-F (e.g., the most recent location sharing request).

In some embodiments, the computing device acquires (606), according to the request, geographical location information of the second user. After receiving the request from the second user, the geographical location information of the second user is acquired, where the geographical location information of the second user can be viewed by the first user. FIG. 4L, for example, shows second client device 104-2 displaying the location interface in response to detecting selection of message 440-F in FIG. 4K. In FIG. 4L, the location interface includes the map with (A) first indicator 476 showing the real-time location of user XX and avatar 442 for user XX indicating that first indicator 476 corresponds to user XX and (B) second indicator 4122 showing the real-time location of user YY and avatar 420 for user YY indicating that first indicator 4122 corresponds to user YY.

For example, a text message clicked by the second user is received and used as the request, the geographical location information of the second user is acquired according to the request, and the second user enters a geographical location information presentation page (e.g., a map) and to view a geographical location of the first user and a geographical location of the second user. In this way, the second user performs geographical location information sharing based on the text message.

In the foregoing embodiment, the second user performs geographical location information sharing by the output text message, providing more diversified manners of participating in geographical location sharing, thereby solving the problem of a single form in which a user participates in geographical location sharing in the prior art, and further achieving an effect of diversified forms in which a user participates in geographical location sharing.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 700, 800, and 900) are also applicable in an analogous manner to method 600 described above with respect to FIG. 6.

Figure 7:
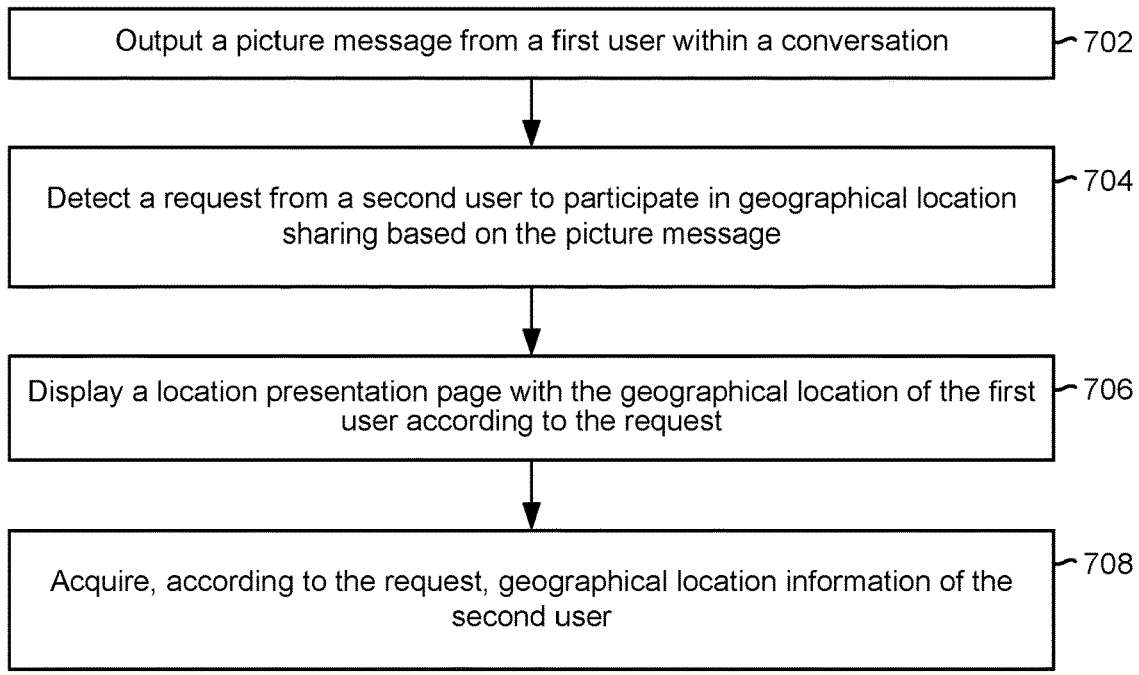
FIG. 7 illustrates a flowchart diagram of a method of location sharing in accordance with some embodiments.

FIG. 7 illustrates a flowchart diagram of a method 700 of location sharing in accordance with some embodiments. In some embodiments, method 700 is performed by a computing device (e.g., associated with a second user) with one or more processors and memory. For example, in some embodiments, method 700 is performed by client device 104 (FIGS. 1 and 3) or a component thereof (e.g., client-side module 102, FIGS. 1 and 3). In some embodiments, method 700 is governed by instructions that are stored in a non-transitory computer readable storage medium and the instructions are executed by one or more processors of the terminal.

In some embodiments, data processing for a social networking platform is implemented in client-server environment 100 (FIG. 1) with a server system 108 and client-side module 102 executed on one or more client devices 104 (e.g., a first client device 104-1 associated with a first user (user XX) and a second client device 104-2 associated with a second user (user YY)). In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

In some embodiments, the computing device outputs (702) a picture message from a first user within a conversation. For example, the form of the picture message is different from that of an ordinary picture message. In some embodiments, the output picture message is a picture that is output after a first user shares geographical location information and displays geographical location information of a geographical user. For example, the output picture message a screenshot of a map displaying a geographical location of the first user. The picture message may also directly display the geographical location of the first user.

In some embodiments, the computing device detects (704) a request from a second user to participate in geographical location sharing based on the picture message. For example, the picture message is used as a function key, the second user clicks the picture message as the request to participate in geographical location sharing.

In some embodiments, the computing device displays (706) a location presentation page (e.g., a map) with the geographical location of the first user according to the request. For example, the second user clicks the picture message, and the computing device receives the request and displays the location presentation page including the geographical location of the first user.

In some embodiments, the computing device acquires (708), according to the request, geographical location information of the second user. For example, the second user performs geographical location sharing by clicking the picture message from the first user. Therefore, the geographical location information of the second user may also be displayed in the location presentation page, so that the second user participates in geographical location sharing of the first user.

In the foregoing embodiment, if a first user performs geographical location sharing by initiating a picture message, a second user can share geographical location information of the second user based on the picture message, thereby achieving an effect of diversified forms in which a user participates in geographical location sharing.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, 800, and 900) are also applicable in an analogous manner to method 700 described above with respect to FIG. 7.

Figure 8:
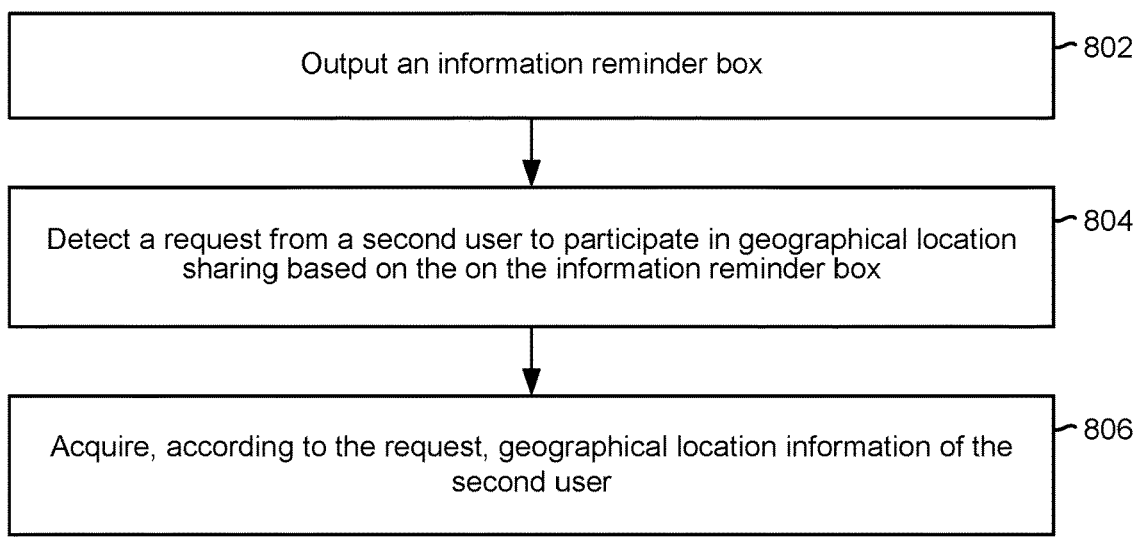
FIG. 8 illustrates a flowchart diagram of a method of location sharing in accordance with some embodiments.
Figure 9A:
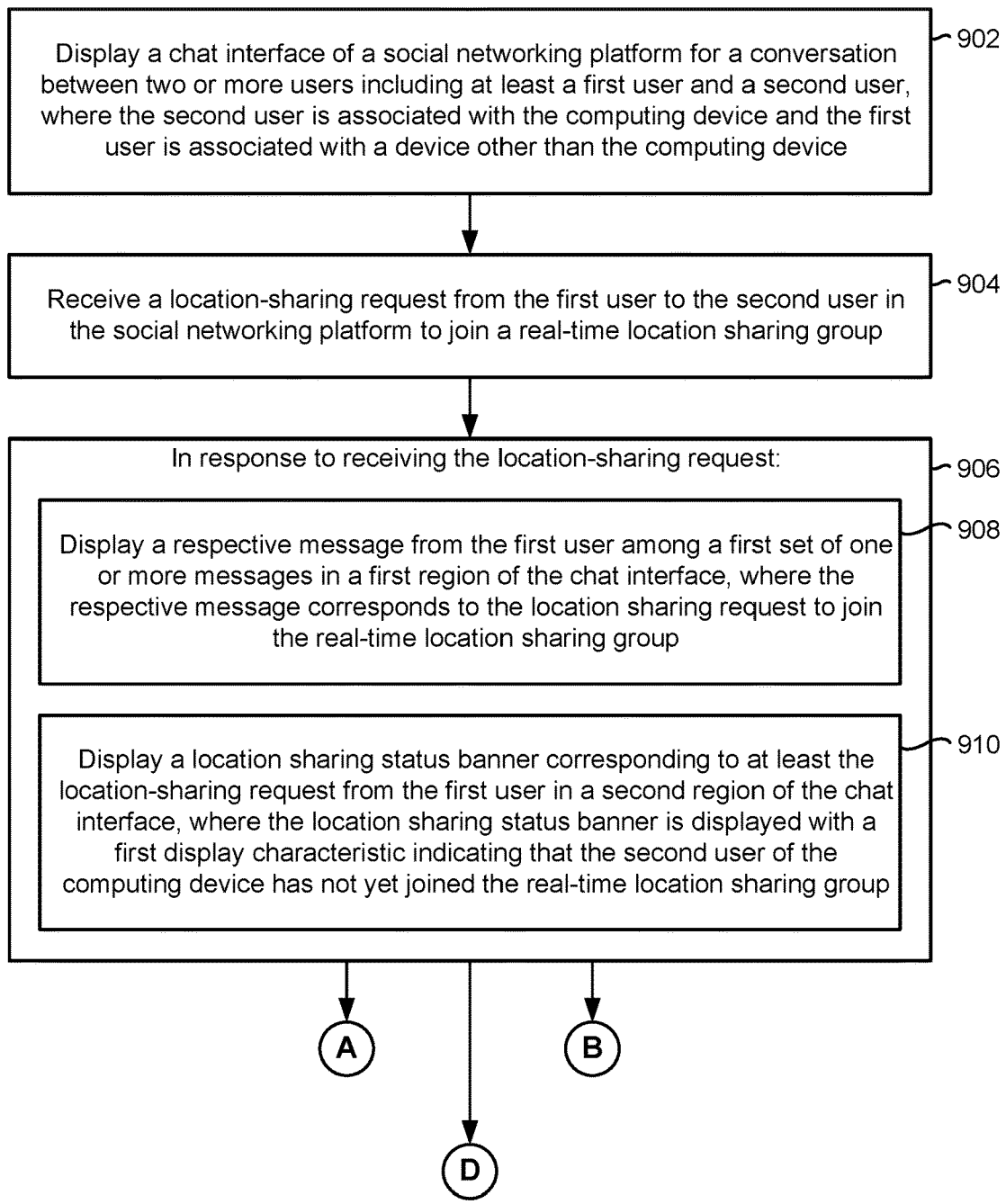
Figure 9B:
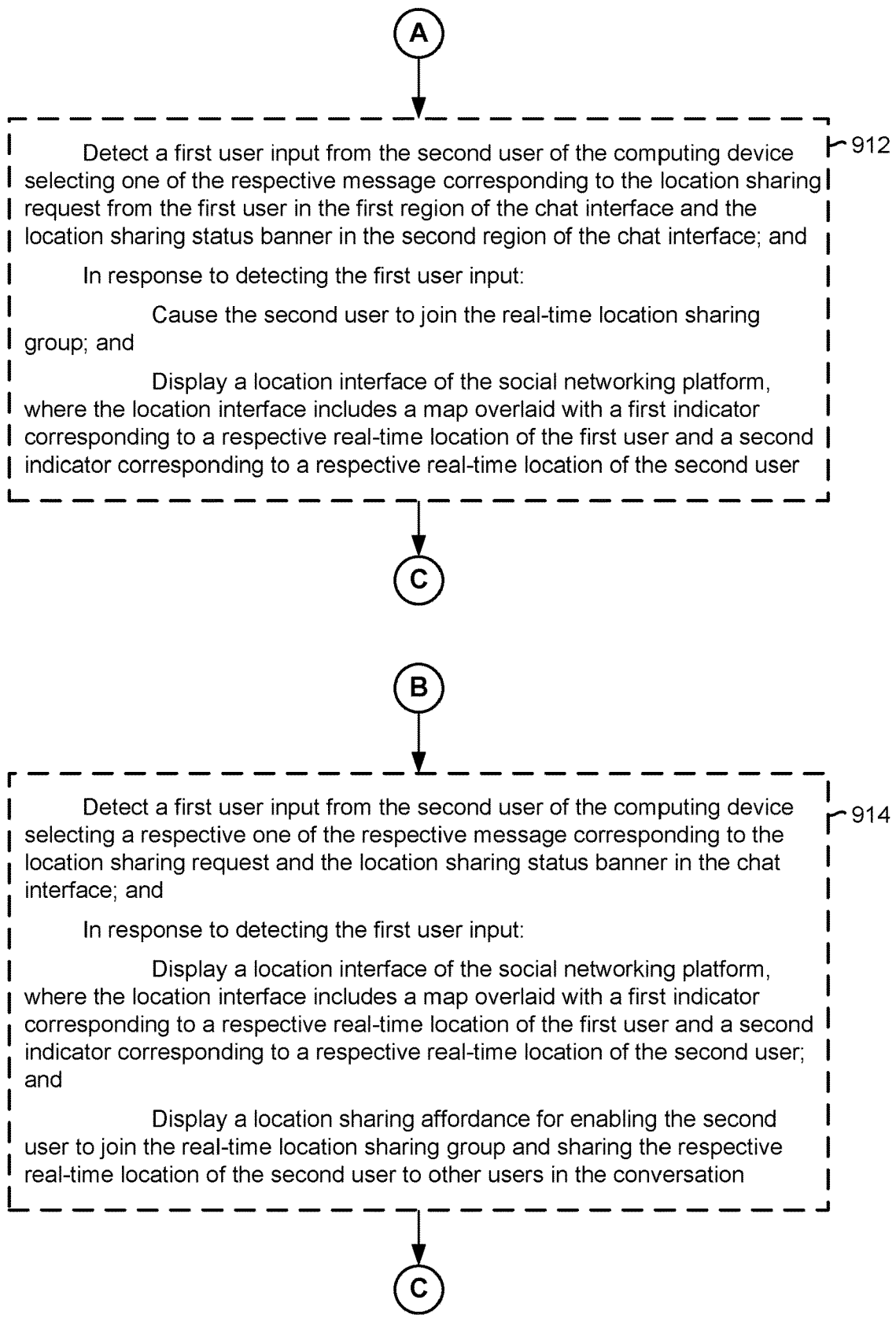
Figure 9D:
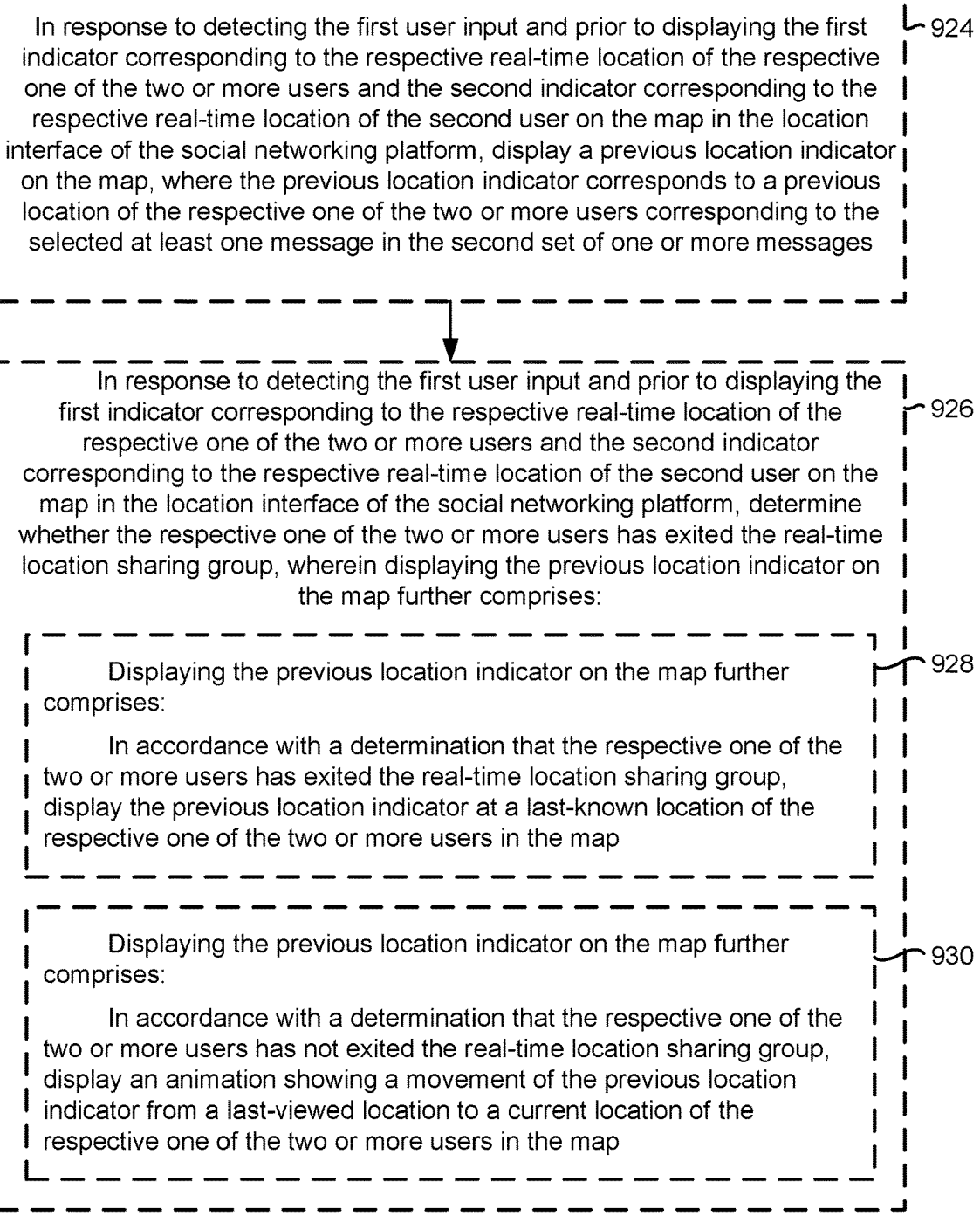

FIG. 8 illustrates a flowchart diagram of a method 800 of location sharing in accordance with some embodiments. In some embodiments, method 800 is performed by a computing device (e.g., associated with a second user) with one or more processors and memory. For example, in some embodiments, method 800 is performed by client device 104 (FIGS. 1 and 3) or a component thereof (e.g., client-side module 102, FIGS. 1 and 3). In some embodiments, method 800 is governed by instructions that are stored in a non-transitory computer readable storage medium and the instructions are executed by one or more processors of the terminal.

In some embodiments, data processing for a social networking platform is implemented in client-server environment 100 (FIG. 1) with a server system 108 and client-side module 102 executed on one or more client devices 104 (e.g., a first client device 104-1 associated with a first user (user XX) and a second client device 104-2 associated with a second user (user YY)). In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

In the foregoing embodiments, both a text message and a picture message may be displayed in a conversation area in a social application. To make it more convenient for a second user to participate in geographical location sharing, an information reminder box may further be set at a location other than the conversation area in the social application, to invite the second user to perform geographical location sharing, as shown in the following embodiments.

In some embodiments, the computing device outputs (802) an information reminder box. In some embodiments, the information reminder box may be located in a non-conversation area of a social application (e.g., an upper area of the social application). FIG. 4G, for examples, shows second client device 104-2 displaying location sharing status banner 4104 within chat interface 4102. In FIG. 4G, location sharing status banner 4104 indicates that user XX (i.e., the first user) has shared his/her real-time location with user YY (i.e., the second user) and further prompts user YY to share his/her real-time location with user XX.

In some embodiments, the computing device detects (804) a request from a second user to participate in geographical location sharing based on the on the information reminder box. For example, the second user performs geographical location sharing by clicking the information reminder box. FIG. 4G, for example, shows second client device 104-2 detecting contact 4106 at a location corresponding to location sharing status banner 4104.

In some embodiments, the computing device acquires (806), according to the request, geographical location information of the second user. The geographical location information of the second user may also be displayed in a location presentation page of a first user, so that the second user participates in geographical location sharing of the first user. The first user can view the geographical location information of the second user, and the second user can also view geographical location information of the first user. FIG. 4J, for example, illustrates second client device 104-2 displaying a location interface in response to detecting selection of location sharing status banner in FIG. 4G. In FIG. 4J, the location interface includes the map with (A) first indicator 476 showing the real-time location of user XX and avatar 442 for user XX indicating that first indicator 476 corresponds to user XX and (B) second indicator 4122 showing the real-time location of user YY and avatar 420 for user YY indicating that first indicator 4122 corresponds to user YY.

Furthermore, the information reminder box not only can be used as a function key by the second user to perform geographical location sharing, but also can present state information of the geographical location sharing. Through the information reminder box, the number of persons participating in geographical location sharing within the conversation can be presented, and a participation state of a user in the conversation can also be presented. In the information reminder box, state information of geographical location sharing is presented by a different text or colors.

In one example, when someone in the conversation participates in geographical location sharing, and the second user does not participate, an information reminder box seen by the second user is gray. If there is only one participant participating in geographical location sharing, the text in the information reminder box displays "xxx is sharing a location" to show who is the sharer participating in geographical location sharing currently. If there is more than one participant participating in geographical location sharing, the text in the information reminder box displays "x persons are sharing locations" to show the number of persons who participate in sharing currently. In another example, if the second user has already participated in geographical location sharing, the information reminder box becomes green, and the text displays "you are sharing a location," and may also display a flickering icon in the information reminder box to remind a user that a geographical location where the user is located may be seen by another person. Because the information reminder box can be used as a shortcut for the second user to perform geographical location sharing, when the second user does not perform geographical location sharing, the second user clicks the grey information reminder box to perform geographical location sharing, and when the second user is already in a state of geographical location sharing, the second user clicks the green information reminder box to view the geographical location presentation page.

Further, after the geographical location sharing information is used to enable a user to participate in geographical location sharing, the data processing method further includes implementing switching between a conversation page and a location presentation page through the information reminder box, and specific steps are as follows: receiving a switch request from a user in the conversation, where the switch request includes a first switch request and a second switch request; switching from the conversation page to the location presentation page according to the first switch request; and switching from the location presentation page to the social application conversation page according to the second switch request, where the social application conversation page switching and the geographical location sharing are performed simultaneously through the switch request.

A click on an information reminder box by a user is received and used as a switch request of the user, where the first switch request is to switch the conversation page to the location presentation page, and the second switch request is to switch the location presentation page to the conversation page. When the conversation page is displayed, the location presentation page may be displayed by clicking the information reminder box, and when the location presentation page is displayed, the page may be switched to the conversation page in time by clicking the information reminder box. When conversation page is displayed, the location sharing being performed is not interrupted, the second user is still in the state of geographical location sharing, and the first user may also view the geographical location of the second user. When the location presentation page is displayed, the conversation is also not ended, and when the location presentation page is displayed, conversation messages may be normally received. If a conversation message needs to be sent without interrupting geographical location sharing, the conversation message can be sent as long as the page is switched to the conversation page. In addition, the geographical location sharing may also be quickly ended from the location presentation page (e.g., by selecting a shortcut "exit" key on location presentation page).

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, 700, and 900) are also applicable in an analogous manner to method 800 described above with respect to FIG. 8.

FIGS. 9A-9D illustrate a flowchart diagram of a method 900 of facilitating access to the Internet in accordance with some embodiments. In some embodiments, method 900 is performed by a computing device with one or more processors and memory. For example, in some embodiments, method 900 is performed by client device 104 (FIGS. 1 and 3) or a component thereof (e.g., client-side module 102, FIGS. 1 and 3). In some embodiments, method 900 is governed by instructions that are stored in a non-transitory computer readable storage medium and the instructions are executed by one or more processors of the computing device. Optional operations are indicated by dashed lines (e.g., boxes with dashed-line borders).

In some embodiments, data processing for a social networking platform is implemented in client-server environment 100 (FIG. 1) with a server system 108 and client-side module 102 executed on one or more client devices 104 (e.g., a first client device 104-1 associated with a first user (user XX) and a second client device 104-2 associated with a second user (user YY)). In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The computing device displays (902) a chat interface of a social networking platform for a conversation between two or more users including at least a first user and a second user, where the second user is associated with the computing device and the first user is associated with a device other than the computing device. FIG. 4G, for example, shows second client device 104-2 displaying a chat interface 4102 between user YY (e.g., the user of second client device 104-2) and user XX (e.g., the user of first client device 104-1). In FIG. 4G, chat interface 4102 also includes a plurality of messages between user YY and user XX including messages 440-A, 440-D, and 440-E sent by user YY as indicated by avatar 420 adjacent to messages 440-A, 440-D, and 440-E and messages 440-B, 440-C, and 440-F sent by user XX as indicated by avatar 442 adjacent to messages 440-B, 440-C, and 440-F.

The computing device receives (904) a location-sharing request from the first user to the second user in the social networking platform to join a real-time location sharing group. For example, the first user and possibly other users in the conversation have already joined the real-time location sharing group. For example, FIGS. 4A-4J show the first user of first client device 104-1 (e.g., user XX) sending a location-sharing request to the second user of second client device 104-2 through chat interface 438 of the social networking platform, where chat interface 438 corresponds to the conversation between user XX and user YY.

In response to receiving (906) the location-sharing request, the computing device: displays (908) a respective message from the first user among a first set of one or more messages in a first region of the chat interface, where the respective message corresponds to the location sharing request to join the real-time location sharing group; and displays (910) a location sharing status banner corresponding to at least the location-sharing request from the first user in a second region of the chat interface, where the location sharing status banner is displayed with a first display characteristic indicating that the second user of the computing device has not yet joined the real-time location sharing group. FIG. 4G, for example, shows second client device 104-2 displaying chat interface 4102 with message 440-F indicating that user XX (i.e., the first user) has shared his/her real-time location with user YY (i.e., the second user). In FIG. 4G, chat interface 4102 also includes location sharing status banner 4104 indicating that user XX (i.e., the first user) has shared his/her real-time location with user YY (i.e., the second user) and further prompts user YY to share his/her real-time location with user XX. For example, location sharing status banner 4104 in FIG. 4G is displayed with a gray background (e.g., the first display characteristics) within the chat interface, where the gray background indicates that the second user of second client device 104-1 has not shared his/her location so as to join the real-time location sharing group. Continuing with this example, after the second user of second client device 104-1 shares his/her location so as to join the real-time location sharing group, location sharing status banner 4104 in FIG. 4K is displayed with a green background (e.g., the second display characteristic) within the chat interface. The aforementioned display characteristic change of the location sharing status banner is illustrative and not meant to be limiting. One of ordinary skill in the art will appreciate, that the display characteristic of the location sharing status banner may change in a multitude of different manners after the second user joins the real-time location sharing group.

In some embodiments, the first region is a dialogue region which shows past messages exchanged between the chat participants (e.g., the region in FIG. 4G with messages 440 sent between user YY and user XX). For example, before the second user joins the group, the banner is gray (e.g., location sharing status banner 4104 in FIG. 4G), and, after the second user joins the group, the banner is green. In some embodiments, the banner includes an affordance to exit the real-time location sharing group. The banner can be overlaid on top of the dialogue region, or displayed above or below the dialogue region. In some embodiments, instead of a banner, some other user interface elements (e.g., a button, an icon) can be used to indicate the location sharing status of the second user. In some embodiments, the location sharing status may be used to represent multiple location sharing requests from multiple users in the conversation. For example, respective messages from two or more users in the conversation may be independently displayed in the dialogue region as the location sharing requests from each of the two or more users are received (e.g., message 440-F from user XX in FIG. 4G), and the location sharing status banner is first displayed when a first such location sharing request is received by the second user, and as subsequent location sharing requests are received from other users in the same group (e.g., by those user joining in the location sharing group one by one), the location sharing status is maintained in the chat interface. In some embodiments, the banner may be updated to show the total count and, optionally, identities of the users that have joined the real-time location sharing group. As time goes on, and as messages are exchanged during the conversation, the messages corresponding to the location sharing requests may be pushed out of view from the chat interface, but the location sharing status banner is maintained in the chat interface, such that the second user can select and join the real-time location sharing group at any time.

In some embodiments, the computing device detects (912) a first user input from the second user of the computing device selecting one of the respective message corresponding to the location sharing request from the first user in the first region of the chat interface and the location sharing status banner in the second region of the chat interface. In some embodiments, in response to detecting the first user input, the computing device: causes the second user to join the real-time location sharing group; and displays a location interface of the social networking platform, where the location interface includes a map overlaid with a first indicator corresponding to a respective real-time location of the first user and a second indicator corresponding to a respective real-time location of the second user. FIG. 4J, for example, shows second client device 104-2 displaying a location interface in response to detecting selection of location sharing status banner in FIG. 4G or message 440-F in FIG. 4K. In FIG. 4J, for example, the location interface includes the map with (A) first indicator 476 showing the real-time location of user XX and avatar 442 for user XX indicating that first indicator 476 corresponds to user XX and (B) second indicator 4122 showing the real-time location of user YY and avatar 420 for user YY indicating that first indicator 4122 corresponds to user YY.

In some embodiments, the location interface includes a chat entry box and chats received or sent while in the location interface appear as chat bubbles originating from the indicators overlaid on the map. In some embodiments, the location interface includes a walkie-talkie activation button (e.g., affordance 480 in FIG. 4J) whereby voice is sent to the other users of the group while the walkie-talkie button is selected (e.g., by a press and hold gesture). In some embodiments, the first indicator (e.g., indicator 476 in FIG. 4J) and the second indicator (e.g., indicator 4122 in FIG. 4J) each has a corresponding avatar displayed over it (e.g., avatars 442 and 420 in FIG. 4J) to represent the identities of the first and second users, and the second user may dismiss the avatars by tapping elsewhere on the location interface. In some embodiments, the second user may zoom in on a user in the group by tapping on their respective indicator or avatar in the map. In some embodiments, the indicators indicate the orientation or heading of the users. For example, in FIG. 4J, the pointed triangle of indicators 476, 4122 indicate the orientation/heading of users XX and YY, respectively. In some embodiments, the indicators indicate whether a user is idle or in motion and also how fast they are moving. In some embodiments, the location interface also has an affordance to exit the real-time location sharing group (e.g., affordance 472 in FIG. 4J). In some embodiments, the location interface also includes an affordance for switching back to the chat interface (e.g., affordance 474 in FIG. 4J).

When the user switches back to the chat interface before terminating the location sharing, the user may return to the location interface by selecting either the message (e.g., message 440-F in FIG. 4G) corresponding to the location sharing request of any of the users that joined the location sharing group, or by selecting the location-sharing status banner displayed in the chat interface (e.g., location sharing status banner 4104 in FIG. 4G). In some embodiments, the user may select the avatar or indicator of a particular user in the map interface to select one or more operations specific to the user represented by the selected avatar or indicator, such as, sending a private message to that user, getting directions from the current location to that user, finding particular businesses (e.g., restaurants, coffee shops, meeting spots, parking, etc.) near both the second user and the selected user, etc. It is worth noting that, after the user selects the message corresponding to the location sharing request or the status banner to automatically join the location sharing group, when the user returns to the chat interface, the appearance of the location sharing status banner would be updated to reflect that the second user is currently sharing location in real time.

In some embodiments, the computing device detects (914) a first user input from the second user of the computing device selecting a respective one of the respective message corresponding to the location sharing request and the location sharing status banner in the chat interface. In some embodiments, in response to detecting the first user input, the computing device: displays a location interface of the social networking platform, where the location interface includes a map overlaid with a first indicator corresponding to a respective real-time location of the first user and a second indicator corresponding to a respective real-time location of the second user; and displays a location sharing affordance for enabling the second user to join the real-time location sharing group and sharing the respective real-time location of the second user to other users in the conversation. FIG. 4I, for example, shows second client device 104-2 displaying a location interface in response to detecting selection of location sharing status banner in FIG. 4G or message 440-F in FIG. 4K. In FIG. 4I, for example, the location interface includes the map with first indicator 476 showing the real-time location of user XX and avatar 442 for user XX indicating that first indicator 476 corresponds to user XX. In FIG. 4I, the location interface also includes share affordance 4118 for sharing the real-location of second client device 104-2 with user XX so as to join the real-time location sharing group.

In some embodiments, the first user cannot see the second user's real-time location until he/she joins the location sharing group. In some embodiments, the second user cannot see the first user's real-time location until he/she joins the location sharing group. In some embodiments, when the second user selects the affordance (e.g., share affordance 4118 in FIG. 4I) to join the real-time location sharing group, a corresponding location sharing request is sent to the server, and a corresponding message from the second user is displayed in the chat interfaces of all participants of the conversation. In some embodiments, selection of the message (e.g., message 440-F in FIG. 4G) corresponding to a location sharing request will cause viewing only with an affordance e.g., share affordance 4118 in FIG. 4I) to join the real-time location sharing group, while selection of the location sharing status banner (e.g., location sharing status banner 4104 in FIG. 4G) will causes automatic joining of the real-time location sharing group. In some embodiments, selection of the message corresponding to a location sharing request will cause automatic joining of the real-time location sharing group, while selection of the location sharing status banner causes viewing only with an affordance to join the real-time location sharing group.

In some embodiments, in response to detecting the first user input, the computing device, displays (916) an interface switching affordance for displaying the chat interface in the location interface. In some embodiments, the computing device detects a second user input from the second user of the computing device selecting the interface switching affordance and, in response to detecting the second user input, displays the chat interface, where the location sharing banner is displayed in the second region of the chat interface with a second display characteristic indicating that the second user of the computing device has joined the real-time location sharing group. FIG. 4K, for example, shows second client device 104-1 displaying chat interface 4102 for the conversation between user YY (e.g., the user of second client device 104-2) and user XX (e.g., the user of first client device 104-1) in response to detecting selection of affordance 474 in the location interface in FIG. 4J. After the second user of second client device 104-1 shares his/her location so as to join the real-time location sharing group, location sharing status banner 4104 in FIG. 4K is displayed with a green background (e.g., the second display characteristic) within the chat interface, where the green background indicates that the second user of second client device 104-1 has shared his/her location so as to join the real-time location sharing group.

In some embodiments, in response to detecting the first user input, the computing device displays (918) at least a first avatar corresponding to the first user and a second avatar corresponding to the second user in a region of the location interface distinct from the map. After the second user joins the location-sharing group, in FIG. 4J, for the location interface also includes region 4116 indicating that user XX is currently sharing his/her location (as indicated by the presence of avatar 442 in region 4116) and that user YY is currently sharing his/her location (as indicated by the presence of avatar 420 in region 4116). In some embodiments, the avatar is a user icon selected by a respective user. In some embodiments, if a user has not selected a custom icon/avatar, the default avatar is a silhouette with the user's initials or user name (e.g., similar to avatar 420 in FIG. 4J). In some embodiments, the avatars displayed over the indicators on the map are the same as the avatars in the region outside the map (e.g., region 4116 in FIG. 4J). In some embodiments, selection of the avatars of a particular subset of one or more users in the region outside of the map in the location interface can cause the map to be re-centered, or zoomed in and/or out to show the indicators of the selected users in the map.

In some embodiments, the computing device detects (920) a second user input from the second user of the computing device selecting the first avatar and, in response to detecting the second user input, centers the map displayed in the first region of the location interface relative to the first indicator corresponding to the real-time location of the first user. For example, with reference to FIG. 4J, the map will be re-centered on indicator 476 corresponding to user XX if the user of second-client device selects avatar 442 in region 4116 (e.g., with a tap gesture). In some embodiments, the map may also be centered relative to the second indicator corresponding to the second user or relative to any other user in the group.

In some embodiments, in response to detecting a scrolling gesture, the computing device displays (922) a second set of one or more messages in the first region of the chat interface, where the second set of one or more messages includes at least one message not included in the first set of one or more messages and corresponding to a previous location sharing request from a respective one of the two or more users. In some embodiments, the computing device detects a first user input from the second user of the computing device selecting the at least one message in the second set of one or more messages displayed in the first region of the chat interface and, in response to detecting the first user input, displays a location interface of the social networking platform, where the location interface includes a map overlaid with a first indicator corresponding to a respective real-time location of the respective one of the two or more users and a second indicator corresponding to a respective real-time location of the second user. In FIG. 4H, for example, second device 104-2 displays chat interface 4102 with at least one message not displayed in FIG. 4G in response to detecting the downwards dragging gesture to scroll chat interface 4102 in FIG. 4G. Subsequently, FIG. 4H, for example, shows second client device 104-2 detecting contact 4114 at a location corresponding to message 440-A (e.g., an old location sharing request). FIG. 4I, for example, shows second client device 104-2 displaying a location interface in response to detecting selection of message 440-A in FIG. 4H.

In some embodiments, in response to detecting the first user input and prior to displaying the first indicator corresponding to the respective real-time location of the respective one of the two or more users and the second indicator corresponding to the respective real-time location of the second user on the map in the location interface of the social networking platform, the computing device displays (924) a previous location indicator on the map, where the previous location indicator corresponds to a previous location of the respective one of the two or more users corresponding to the selected at least one message in the second set of one or more messages. In some embodiments, after selecting an old message corresponds to a location sharing request, the location of the first and/or second user at the time the selected old message was sent/received is shown in the location interface before showing the real-time locations of the first and/or second user.

In some embodiments, in response to detecting the first user input and prior to displaying the first indicator corresponding to the respective real-time location of the respective one of the two or more users and the second indicator corresponding to the respective real-time location of the second user on the map in the location interface of the social networking platform, the computing device determines (926) whether the respective one of the two or more users has exited the real-time location sharing group.

In some embodiments, displaying the previous location indicator on the map further comprises (928) displaying the previous location indicator at a last-known location of the respective one of the two or more users in the map in accordance with a determination that the respective one of the two or more users has exited the real-time location sharing group. For example, if the sender of the selected message is no longer part of the real-time location sharing group, the computing device displays the last known location of the sender (e.g., the location of the sender at the time the selected message was sent or a subsequent location) in the location interface.

In some embodiments, displaying the previous location indicator on the map further comprises (930) displaying an animation showing a movement of the previous location indicator from a last-viewed location to a current location of the respective one of the two or more users in the map in accordance with a determination that the respective one of the two or more users has not exited the real-time location sharing group. For example, if the sender of the selected message is still part of the real-time location sharing group, the computing device displays the last known location of the sender (e.g., the location of the sender at the time the selected message was sent or a subsequent location) in the location interface and an animation estimating the sender's path to the sender's current real-time location.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, 700, and 800) are also applicable in an analogous manner to method 900 described above with respect to FIGS. 9A-9D.

Figure 10:
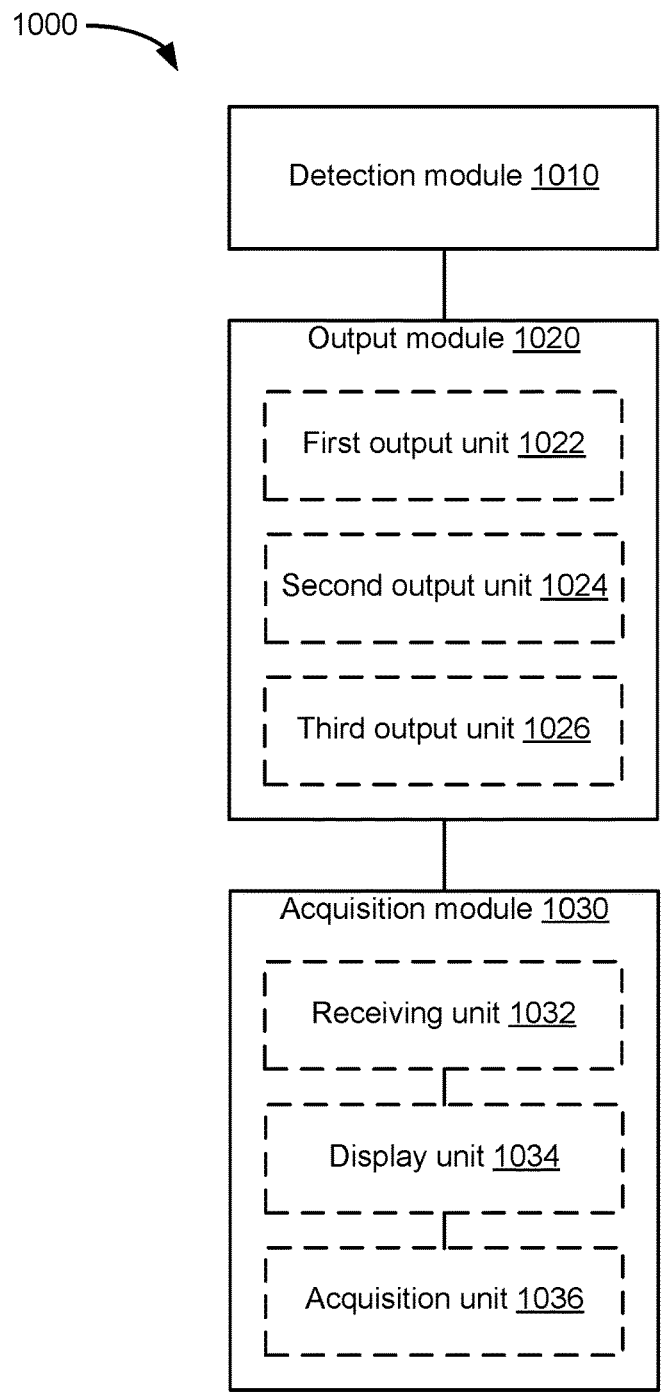
FIG. 10 is a block diagram of an apparatus for location sharing in accordance with some embodiments.

FIG. 10 is a block diagram of an apparatus 1000 for location sharing in accordance with some embodiments. In some embodiments, apparatus 1000 may be implemented in whole or in part by software, hardware, or a combination thereof. For example, apparatus 1000 corresponds to client device 104 (FIGS. 1 and 3) or a component thereof (e.g., client-side module 102, FIGS. 1 and 3). In some embodiments, apparatus 1000 includes: detection module 1010, output module 1020, and acquisition module 1030.

In some embodiments, detection module 1010 is configured to determine whether location sharing information exists in a conversation, where the location sharing information is geographical location information shared by a first user in the social application. The conversation may be an instant messaging conversation between two or more users within a social application. If the first user initiates geographical location sharing, detection module 1010 may detect geographical location sharing information. The geographical location sharing information is the geographical location information shared by the first user, and the geographical location sharing information may prompt the user of apparatus 1000 (i.e., the second user) to share geographical location information.

In some embodiments, output module 1020 is configured to output a location sharing invitation if the conversation includes the location sharing information. In some embodiments, output module 1020 also includes: a first output unit 1022, a second output unit 1024, and/or a third output unit 1026.

In some embodiments, first output unit 1022 is configured to output a text message within the conversation. For further discuss of the text message, see FIG. 6 and the accompanying text.

In some embodiments, second output unit 1024 is configured to output a picture message within the conversation. For further discuss of the picture message, see FIG. 7 and the accompanying text.

In some embodiments, third output unit 1026 is configured to output an information reminder box. For further discuss of the information reminder box, see FIG. 8 and the accompanying text.

In some embodiments, acquisition module 1030 is configured to acquire geographical location information based on the output geographical location sharing invitation. In some embodiments, acquisition module 1030 also includes: a receiving unit 1032, a display unit 1034, and an acquisition unit 1036.

In some embodiments, receiving unit 1032 is configured to receive a request from to participate in geographical location sharing based on the text message, picture message, or information reminder box.

In some embodiments, display unit 1034 is configured to display a location presentation page with the geographical location information.

In some embodiments, acquisition unit 1036 is configured to acquire geographical location information of the user of apparatus 1000 according to the request received by receiving unit 1032.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of sharing real-time location among users of a social networking platform, the method comprising:
   at a computing device with one or more processors and memory:
      displaying a chat interface between a first user and a second user, wherein the second user is associated with the computing device and the first user is associated with a device other than the computing device;
      receiving a location-sharing request from the first user to the second user to join a real-time location sharing group, and displaying, in the chat interface, a location-sharing message corresponding to the location sharing request to join the real-time location sharing group, wherein the location-sharing message is displayed in the chat interface as one of a plurality of chat messages that are exchanged between the first user and the second user during a chat session and remains in the chat interface after a more recent chat message than the location-sharing message is received by the computing device and displayed in the chat interface;
      detecting a first user input on the location-sharing message from the second user of the computing device; and
      in response to detecting the first user input:
         replacing the chat interface with a location interface of the social networking platform, wherein the location interface includes a map overlaid with a first indicator corresponding to a respective real-time location of the first user and a second indicator corresponding to a respective real-time location of the second user.

2. The method of claim 1, wherein the location interface further includes a location-sharing exit affordance, the method further comprising:
   detecting a second user input on the location-sharing exit affordance from the second user of the computing device; and
   in response to detecting the second user input:
      ceasing to send the respective real-time location of the second user to the first user; and
      replacing the location interface with the chat interface, wherein the chat interface includes a location sharing status banner corresponding to the location-sharing request from the first user.

3. The method of claim 1, wherein the location interface further includes an interface switching affordance, the method further comprising:
   detecting a third user input on the interface switching affordance from the second user of the computing device; and
   in response to detecting the third user input:
      switching from the location interface back to the chat interface; and
      displaying, in the chat interface, a location sharing status banner indicating continuous sharing of the respective real-time location of the second user to the first user while the first user and the second user are exchanging one or more chat messages in the chat interface during the chat session.

4. The method of claim 1, further comprising:
   displaying a set of messages in the chat interface, wherein the set of messages includes an old location sharing message corresponding to a previous location sharing request from the first user;
   detecting a fourth user input on the old location sharing message from the second user of the computing device; and
   in response to detecting the first user input:
      replacing the chat interface with a location interface including a map; and
      displaying, on the map in the location interface, a previous location indicator corresponding to a previous location of the first user when the previous location sharing request was received by the computing device.

5. The method of claim 4, wherein displaying the previous location indicator on the map further comprises:
   in accordance with a determination that the first user has exited the real-time location sharing request, displaying the previous location indicator at a last-known location of the first user on the map.

6. The method of claim 4, wherein displaying the previous location indicator on the map further comprises:
   in accordance with a determination that the first user has not exited the real-time location sharing request, displaying an animation showing a movement of the previous location indicator from a last-known location of the first user to the current location of the first user on the map.

7. A computing device for sharing real-time location among users of a social networking platform, comprising:
   one or more processors; and
   memory storing one or more programs to be executed by the one or more processors, the one or more programs comprising instructions for:
      displaying a chat interface between a first user and a second user, wherein the second user is associated with the computing device and the first user is associated with a device other than the computing device;
      receiving a location-sharing request from the first user to the second user to join a real-time location sharing group, and displaying, in the chat interface, a location-sharing message corresponding to the location sharing request to join the real-time location sharing group, wherein the location-sharing message is displayed in the chat interface as one of a plurality of chat messages that are exchanged between the first user and the second user during a chat session and remains in the chat interface after a more recent chat message than the location-sharing message is received by the computing device and displayed in the chat interface;

detecting a first user input on the location-sharing message from the second user of the computing device; and in response to detecting the first user input:
replacing the chat interface with a location interface of the social networking platform, wherein the location interface includes a map overlaid with a first indicator corresponding to a respective real-time location of the first user and a second indicator corresponding to a respective real-time location of the second user.

8. The computing device of claim 7, wherein the location interface further includes a location-sharing exit affordance, and the one or more programs further comprise instructions for:

detecting a second user input on the location-sharing exit affordance from the second user of the computing device; and in response to detecting the second user input:
ceasing to send the respective real-time location of the second user to the first user; and
replacing the location interface with the chat interface, wherein the chat interface includes a location sharing status banner corresponding to the location-sharing request from the first user.

9. The computing device of claim 7, wherein the location interface further includes a location-sharing exit affordance, and the one or more programs further comprise instructions for:

detecting a third user input on the interface switching affordance from the second user of the computing device; and in response to detecting the third user input:
switching from the location interface back to the chat interface; and
displaying, in the chat interface, a location sharing status banner indicating continuous sharing of the respective real-time location of the second user to the first user while the first user and the second user are exchanging one or more chat messages in the chat interface during the chat session.

10. The computing device of claim 7, wherein the one or more programs further comprise instructions for:

displaying a set of messages in the chat interface, wherein the set of messages includes an old location sharing message corresponding to a previous location sharing request from the first user;

detecting a fourth user input on the old location sharing message from the second user of the computing device; and in response to detecting the first user input:
replacing the chat interface with a location interface including a map; and
displaying, on the map in the location interface, a previous location indicator corresponding to a previous location of the first user when the previous location sharing request was received by the computing device.

11. The computing device of claim 10, wherein the instruction for displaying the previous location indicator on the map further comprises:

in accordance with a determination that the first user has exited the real-time location sharing request, displaying the previous location indicator at a last-known location of the first user on the map.

12. The computing device of claim 10, wherein the instruction for displaying the previous location indicator on the map further comprises:

in accordance with a determination that the first user has not exited the real-time location sharing request, displaying an animation showing a movement of the previous location indicator from a last-known location of the first user to the current location of the first user on the map.

13. A non-transitory computer readable storage medium storing one or more programs for sharing real-time location among users of a social networking platform, the one or more programs comprising instructions, which, when executed by a computing device with one or more processors, cause the computing device to perform operations including:

displaying a chat interface between a first user and a second user, wherein the second user is associated with the computing device and the first user is associated with a device other than the computing device;

receiving a location-sharing request from the first user to the second user to join a real-time location sharing group, and displaying, in the chat interface, a location-sharing message corresponding to the location sharing request to join the real-time location sharing group, wherein the location-sharing message is displayed in the chat interface as one of a plurality of chat messages that are exchanged between the first user and the second user during a chat session and remains in the chat interface after a more recent chat message than the location-sharing message is received by the computing device and displayed in the chat interface;

detecting a first user input on the location-sharing message from the second user of the computing device; and in response to detecting the first user input:
replacing the chat interface with a location interface of the social networking platform, wherein the location interface includes a map overlaid with a first indicator corresponding to a respective real-time location of the first user and a second indicator corresponding to a respective real-time location of the second user.

14. The non-transitory computer readable storage medium of claim 13, wherein the location interface further includes a location-sharing exit affordance, and the one or more programs further comprise instructions for:

detecting a second user input on the location-sharing exit affordance from the second user of the computing device; and in response to detecting the second user input:
ceasing to send the respective real-time location of the second user to the first user; and
replacing the location interface with the chat interface, wherein the chat interface includes a location sharing status banner corresponding to the location-sharing request from the first user.

15. The non-transitory computer readable storage medium of claim 13, wherein the location interface further includes a location-sharing exit affordance, and the one or more programs further comprise instructions for:

detecting a third user input on the interface switching affordance from the second user of the computing device; and in response to detecting the third user input:
switching from the location interface back to the chat interface; and
displaying, in the chat interface, a location sharing status banner indicating continuous sharing of the respective real-time location of the second user to the first user while the first user and the second user are exchanging one or more chat messages in the chat interface during the chat session.

16. The non-transitory computer readable storage medium of claim 13, wherein the one or more programs further comprise instructions for:
displaying a set of messages in the chat interface, wherein the set of messages includes an old location sharing message corresponding to a previous location sharing request from the first user;
detecting a fourth user input on the old location sharing message from the second user of the computing device; and in response to detecting the first user input:
replacing the chat interface with a location interface including a map; and
displaying, on the map in the location interface, a previous location indicator corresponding to a previous location of the first user when the previous location sharing request was received by the computing device.

17. The non-transitory computer readable storage medium of claim 16, wherein the instruction for displaying the previous location indicator on the map further comprises:
in accordance with a determination that the first user has exited the real-time location sharing request, displaying the previous location indicator at a last-known location of the first user on the map.

18. The non-transitory computer readable storage medium of claim 16, wherein the instruction for displaying the previous location indicator on the map further comprises:
in accordance with a determination that the first user has not exited the real-time location sharing request, displaying an animation showing a movement of the previous location indicator from a last-known location of the first user to the current location of the first user on the map.

* * * * *